United States Patent [19]
Fowlow et al.

[11] Patent Number: 5,860,004
[45] Date of Patent: Jan. 12, 1999

[54] CODE GENERATOR FOR APPLICATIONS IN DISTRIBUTED OBJECT SYSTEMS

[75] Inventors: Brad G. Fowlow, Redwood City; Gregory B. Nuyens, Menlo Park; Hans E. Muller, Saratoga, all of Calif.

[73] Assignee: Sun Microsystems, Inc., Palo Alto, Calif.

[21] Appl. No.: 674,828

[22] Filed: Jul. 3, 1996

[51] Int. Cl.[6] .............................. G06F 9/40; G06F 17/30
[52] U.S. Cl. ........................................................... 395/701
[58] Field of Search .................................... 395/701, 705, 395/707

[56] References Cited

U.S. PATENT DOCUMENTS

| | | | |
|---|---|---|---|
| 5,261,098 | 11/1993 | Katin et al. | 395/650 |
| 5,339,419 | 8/1994 | Chan et al. | 395/707 |
| 5,339,433 | 8/1994 | Frid-Nielsen | 395/700 |
| 5,392,448 | 2/1995 | Frankel et al. | 395/800 |
| 5,414,806 | 5/1995 | Richards | 395/135 |
| 5,446,902 | 8/1995 | Islam | 395/700 |
| 5,450,583 | 9/1995 | Inada | 395/650 |
| 5,475,817 | 12/1995 | Waldo et al. | 395/650 |
| 5,524,246 | 6/1996 | Hurley et al. | 395/700 |
| 5,659,735 | 8/1997 | Parrish et al. | 395/610 |
| 5,671,415 | 9/1997 | Hossain | 395/701 |
| 5,692,183 | 11/1997 | Hapner et al. | 395/614 |
| 5,699,310 | 12/1997 | Garloff et al. | 395/701 |
| 5,721,911 | 2/1998 | Ha et al. | 395/611 |
| 5,724,589 | 3/1998 | Wold | 395/701 |

OTHER PUBLICATIONS

Summers et al., "Visual Programming Language Bibliography", Nov. 29, 1995, Department of Computer Science from Oregon State Internet Website.

Al-Salqan et al., "MediaWare: A Distributed Multimedia Environment with Interoperability", Apr. 20, 1995, IEEE.

Gamma et al., "Design Patterns Elements of Reusable Object-Oriented Software", 1995, Addison-Wesley Professional Computing Series.

*Primary Examiner*—Kevin J. Teska
*Assistant Examiner*—Ayni Mohamed
*Attorney, Agent, or Firm*—Beyer & Weaver, LLP

[57] ABSTRACT

A technique for automating the assembly of networked, language independent objects into a network application for use in a distributed object computing system uses program templates and a symbol table. A schematic representation of the network application is formed within a visual application builder. The schematic representation defines connections among representations of previously defined distributed objects. These connections are formed among parts, plugs and sockets that are associated with representations of distributed objects termed components. The schematic representation of the network application is loaded into a symbol table and portions of the schematic representation are stored as a number of entries in the symbol table. These entries include identifier-value pairs; that is, identifiers are mapped to values. The program source files to be generated are determined and the program templates for use in generating the program source file are also determined. The program templates include identifiers that correspond to the entries in the symbol table. The program templates are combined with the symbol table to generate at least one program source file. Identifiers in the templates are replaced with the corresponding values from the symbol table. The program source file is suitable for being compiled and linked to form a portion of the network application.

28 Claims, 13 Drawing Sheets

CODE GENERATOR FOR APPLICATIONS IN DISTRIBUTED OBJECT SYSTEMS

CROSS REFERENCE TO RELATED APPLICATIONS

The following U.S. patent applications, all filed concurrently herewith, are related to the present application and are incorporated by reference herein in their entirety: application Ser. No. 08/675,563, application Ser. No. 08/675,850, and application Ser. No. 08/675,094.

BACKGROUND OF THE INVENTION

1. The Field of the Invention

The present invention relates to the fields of distributed computing systems, client-server computing and object-oriented programming. More specifically, the present invention relates to creating and installing applications on a distributed object system.

2. The Relevant Art

Object-oriented programming methodologies have received increasing attention over the past several years in response to the increasing tendency for software developed using traditional programming methods to be delivered late and over budget. One problem with traditional programming techniques stems from the emphasis placed on procedural models and "linear" code that often is extremely difficult to design and maintain. Generally, large programs created using traditional methods are "brittle", that is, even small changes can affect all elements of the programming code. Thus, minor changes made to the software in response to user demands can require major redesign and rewriting of the entire program.

Object-oriented programming strategies tend to avoid these problems because object methodologies focus on manipulating data rather than procedures; thus providing the programmer with a more intuitive approach to modeling real world problems. In addition, objects encapsulate related data and procedures so as to hide that information from the remainder of the program by allowing access to the data and procedures only through the object's interface. Hence changes to the data and or procedures of te object are relatively isolated from the remainder of the program. This provides code that Is more easily maintained as compared to code written using traditional methods, as changes to an object's code do not affect the code in the other objects. Furthermore, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

The object metaphor in distributed systems is a useful technique as it separates the object's interface from its implementation; thereby allowing software designers to take advantage of the functionalities of various objects available to them without having to worry about the details of the object's implementation. The programmer need only be aware of the object's interface. In addition, object-oriented distributed systems allow for object implementations that may reside on different computing platforms that have been connected through a network. Thus, a programmer working on one machine of a network may make a call to an object about which the programmer only knows the object's interface with the confidence that at the appropriate time that the remote object will be accessed and return its data so that the programmers code will function properly. Such a system thus maximizes the inherent advantages of object-oriented methodologies by taking full advantage of their modularity and encapsulation.

Although the advantages to employing object-oriented programming methodologies through distributed object systems are significant, there remain major hurdles to their implementation. In general, the goal of implementing the re-use of software during the programming process, even in the context of object programming, is difficult to achieve. Typically, programmers are reluctant to use code about which their understanding is minimal or even nonexistent. This is compounded in distributed object systems as the developer(s) of the code may not be easily reached to provide comments and instruction to the programmer whose task is to develop a new application. Thus, although much useful code may be available to the programmer throughout the distributed object system that programmer may not be able to take full advantage of it, thus being forced to rewrite sections of code that have already been developed.

Present methodologies for sharing code are inadequate in the distributed object model. Current methods for sharing object code include the use of shared libraries, publicly available directories of header files, and the wide-spread distribution of documentation (either electronically or by hard copy). These methods, however, do not lend themselves well to adaptation in a distributed object environment in which the basic elements being manipulated are not file-based but rather are interface-based. Also, methods for re-using objects in a distributed object system should seek to increase the user's sense of a "community" of programmers and the code they produce. Thus, systems seeking to increase the re-use of objects in a distributed object system should facilitate the user's determination of an object's identity, its purpose, and its method of use.

As described in co-pending U.S. patent application Ser. No. 08/414,240, incorporated herein by reference for all purposes, another challenge to programming in a distributed object environment is the need to provide large amounts of "boilerplate" type computer code so that objects and applications developed for use in the distributed object system can function properly within that system; in particular, the need to provide basic computer code structures to enable ordinary objects (i.e., C++objects) to function as distributed objects. In addition, however, the programmer seeking to maximize the re-use of existing objects and computer code in the distributed objects system is faced with similar although slightly different challenges. When a programmer wishes to employ an object in an application being developed, the programmer must indicate basic information pertaining to the object such as the name of the object's factory and must provide various initialization data. In addition, a variety of makefiles, header files, and library dependencies must be accounted for in the code before that code is forwarded to additional facilities such as described in co-pending U.S. patent application Ser. No. 08/414,240. Additional details that must be provided by the programmer include various exception handling, debugging, and tracing support code. Again, although the methods and code required are generally known to those of skill in the art, the implementation of such routines is laborious, repetitive, and prone to error. Thus, the development of appropriately coded object applications is an extremely time consuming and painstaking task. It would therefore be preferable to automate the incorporation of such "housekeeping" code.

Unfortunately, most programming objects currently in existence are not written to support the functionalities required for placement on a distributed operating system. Thus, the implementation of existing objects on such systems would require much retooling of the existing object software. This would lessen the advantages afforded by object programming methodologies as existing programming objects would not be easily available in distributed object systems.

An additional difficulty with implementing distributed objects on distributed object systems arises from the need to inform the system of the presence of the objects at the time of their installation. Since all client requests are processed through the object request broker, or ORB, the ORB must have knowledge of the existence of the objects. Furthermore, it is preferable in distributed object systems to have functionalities that allow for a clear distinction between objects that are in the development phase and objects that are available to users on the distributed object system generally. Providing such awareness poses various difficulties for the programmer who must bear the burden of implementing a wide variety of "housekeeping" operations to take advantage of the benefits of the distributed object system.

The full promise of object-oriented methodologies, especially the advantages afforded by their modularity, have yet to be achieved. In particular, it would be highly desirable to allow programmers and other users the ability to create and install distributed objects in a relatively transparent fashion so that objects created in different programming languages and/or objects residing on different computing platforms can be made available on distributed object systems without extensive modification of programming code or placing an undue burden on the user. Thus, it would be preferable to have a system capable of handling the formation and installation of distributed objects that minimizes the need for the programmer or the user to be familiar with the details of distributed object systems. More preferable is a system in which programming objects that are not distributed can be transformed into a distributed object relatively transparently with respect to the programmer or the user.

SUMMARY OF THE INVENTION

One embodiment of the present invention relates to a computer-implemented method of automating the assembly of networked, language independent objects into a network application. This network application may then be used in a distributed object computing system. A model of this network application, or a schematic representation, may be formed within a composition builder. The composition builder being a suitable development tool for creating this schematic representation. Once the schematic representation has been prepared a step of receiving the schematic representation of the network application is performed. The schematic representation defining a number of links among representations of previously defined distributed objects. Next, the schematic representation of the network application is loaded into a symbol table and portions of the schematic representation are stored as a number of entries in the symbol table. Another step involves determining at least one program source file to be generated and at least one corresponding program template for use in generating the program source file. The program template includes references to the plurality of entries in the symbol table. An additional step requires combining the plurality of entries in the symbol table with at least one corresponding program template to generate at least one program source file. This program source file is suitable for being compiled to form a portion of the network application.

In one embodiment, the schematic representation is formed within a visual application builder and is arranged to represent a client object or a server object. Also, the plurality of links among representations of distributed objects may be formed by a combination of elements including parts, plugs and sockets. And the loading step may involve loading parts, plugs and sockets of the schematic representation into the symbol table.

In an embodiment of the symbol table, each entry in the symbol table includes an identifier that maps into a corresponding value, and the step of combining the plurality of entries is operative to replace the references to the identifiers in a program template with corresponding values from the symbol table.

In other embodiments, further steps include creating a schematic representation of the network application within a visual application builder and requesting of an object development facility that the generated program source files be compiled and linked into an executable network application.

One embodiment of the present invention relates to loading information into a symbol table. This embodiment is a computer-implemented method of loading a schematic representation of a network application into a symbol table thereby assisting in automating the assembly of networked, language independent objects into a network application for use in a distributed object computing system. The symbol table is arranged to map a plurality of identifiers to a corresponding plurality of values. The schematic representation includes elements that are associated with identifiers that have values. The method includes various steps that may be performed in any order. In one step, top-level symbols from the schematic representation are loaded into the symbol table such that identifiers associated with the top-level symbols are mapped to corresponding values. In a second step, parts from the schematic representation are loaded into the symbol table such that identifiers associated with the parts are mapped to corresponding values. In a third step, connections from the schematic representation are loaded into the symbol table such that identifiers associated with said connections are mapped to corresponding values. Other embodiments include the steps of loading file descriptors, plugs and sockets in similar fashion.

DESCRIPTION OF SPECIFIC EMBODIMENTS

1. Physical Embodiments and Background of Distributed Object Systems

Figure 1:
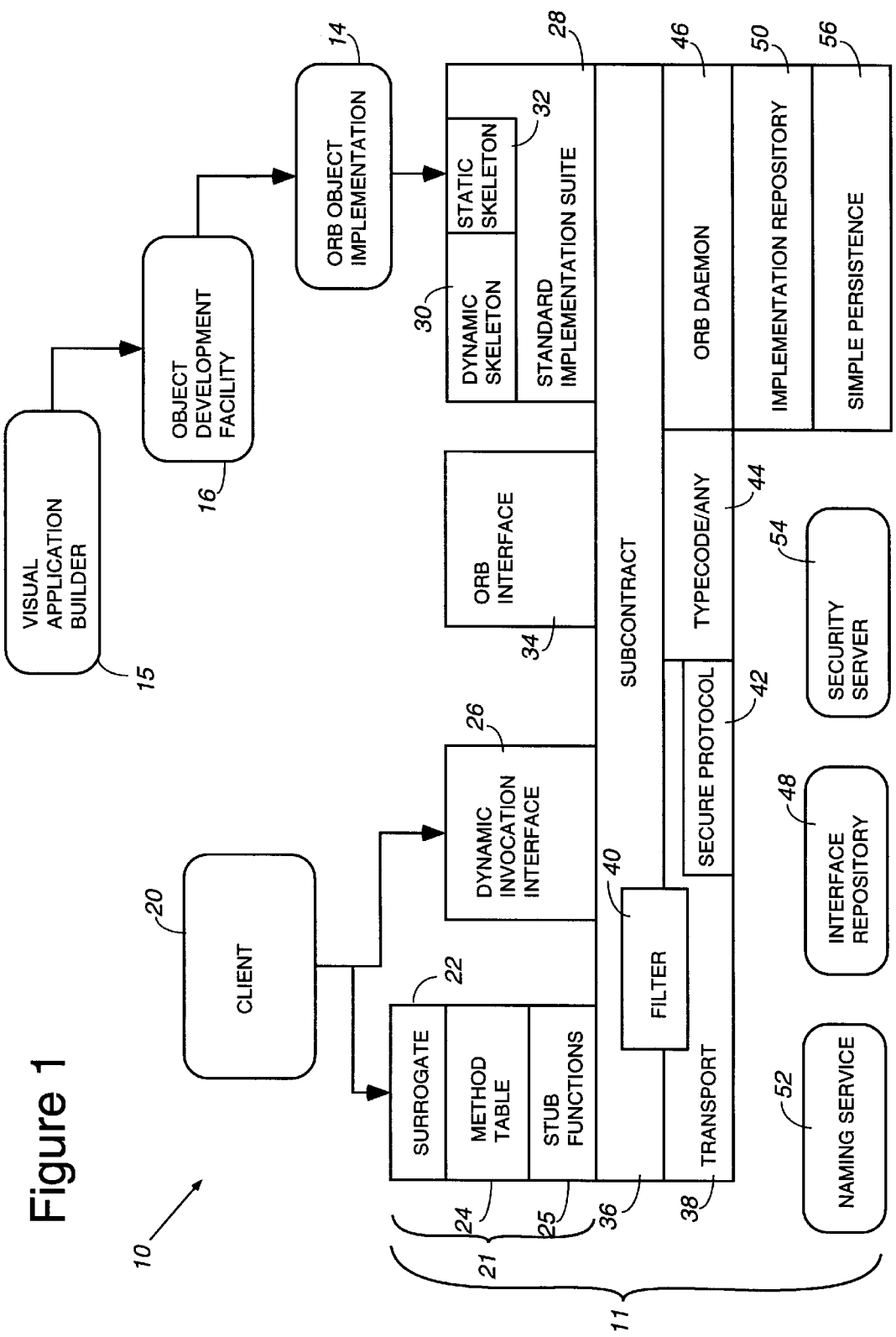
FIG. 1 is a schematic illustration of a distributed object system in accordance with the present invention.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, an embodiment of the present invention will be described primarily within the context of an Object Request Broker (ORB) implemented under the CORBA specification from the Object Management Group (OMG), Revision 2.0, dated July 1995, which is incorporated herein by reference. FIG. 1 diagrammatically illustrates the overall architecture of a representative distributed object system suitable for implementing an embodiment of the present invention.

A distributed object system 10 typically includes an Object Request Broker (ORB) 11 as is symbolically illustrated in FIG. 1. ORB 11 provides all of the location and transport mechanisms and facilities necessary to deliver a call from a client to a servant (target object) and to return a response to the client. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++ object that has been provided by an application developer. Alternatively, an implementation for a distributed object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests.

Subcontract layer 36 provides the functionality required by an object in order to utilize subcontracts to implement various services (or features or object mechanisms) named by a particular subcontract, as described in greater detail in U.S. patent application Ser. No. 08/1554,794, filed Nov. 11, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in U.S. patent application Ser. No. 08/670,682 . Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in U.S. patent application Ser. No. 08/673,181. A technique for marshaling/ unmarshaling an object reference is described in U.S. patent application Ser. No. 08/670,681.

A standard implementation suite 28 (or object adapter) represents a set of subcontracts that interact with ORB objects 14 in identical ways, as for example object key management. One such implementation suite is described in U.S. patent application Ser. No. 08/669,782. It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object. Thus, skeletons 30 and 32 call an appropriate servant object. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data. An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

The computer-implemented methods described herein can be implemented using techniques and apparatus well-known in the computer science arts for executing computer program instructions on computer systems. As used herein, the term "computer system" is defined to include, although is not limited solely to, a processing device (such as a central processing unit, CPU) for processing data and instructions that is coupled with one or more data storage devices for exchanging data and instructions with the processing unit, including, but not limited to, RAM, ROM, CD-ROM, hard disks, and the like. The data storage devices can be dedicated, i.e., coupled directly with the processing unit, or remote, i.e., coupled with the processing unit, over a computer network. It will be appreciated that remote data storage devices coupled to a processing unit over a computer network can be capable of sending program instructions to a processing unit for execution on a particular workstation. In addition, the processing device can be coupled with one or more additional processing devices, either through the same physical structure (e.g., in a parallel processor), or over a computer network (e.g., a distributed processor.). The use of such remotely coupled data storage devices and processors will be familiar to those of skill in the computer science arts (see, e.g., Ralston 1993).

The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide" areas (e.g., over tens, hundreds, or thousands of miles. WAN), or local area networks (e.g., over several feet to hundreds of feet, LAN). Furthermore, various local-and wide-area networks can be combined to form aggregate networks of computer systems. One example of such a confederation of computer networks is the "Internet".

Figure 2:
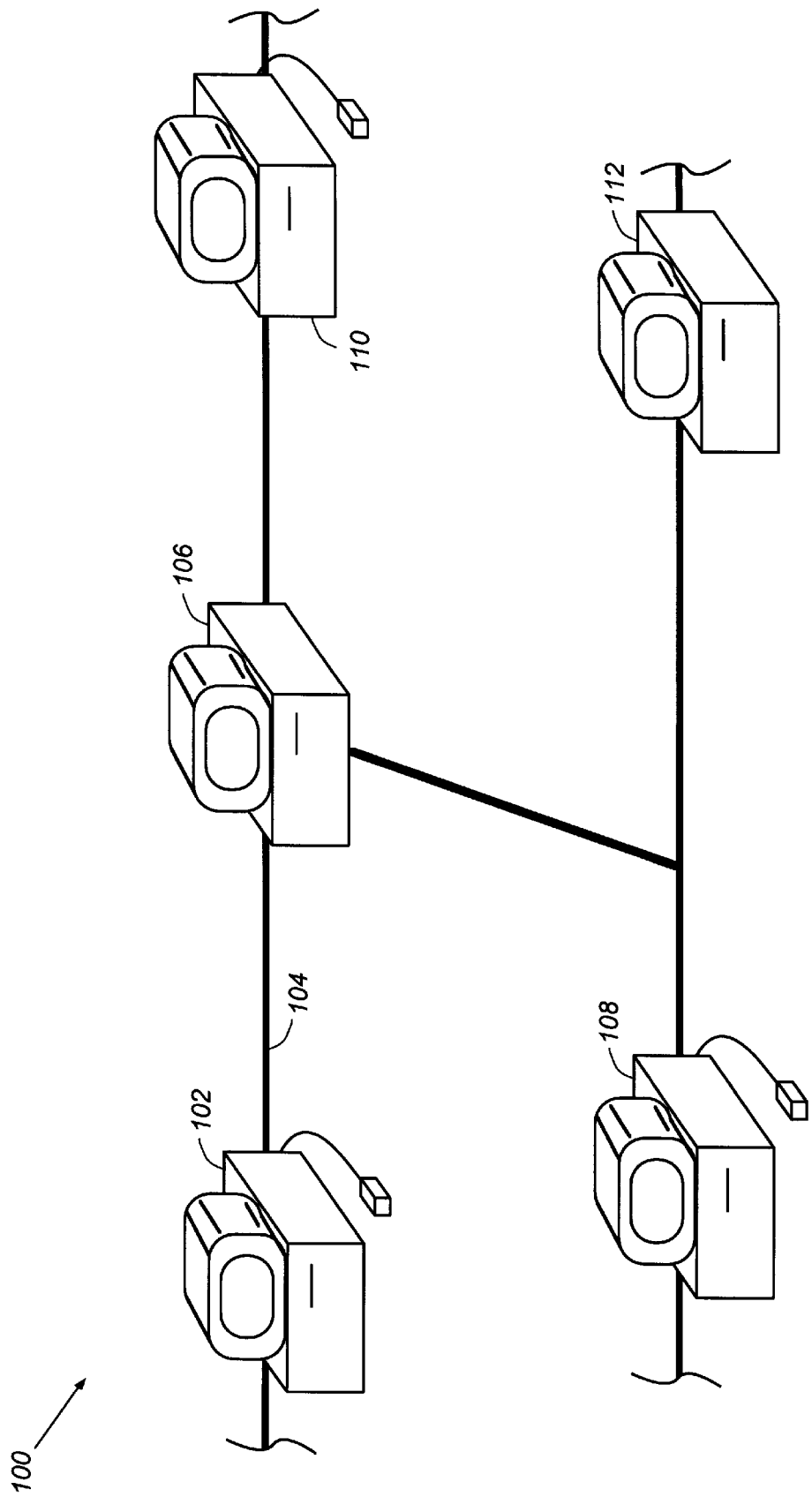
FIG. 2 is an illustration of a computer network in accordance with the present invention.

In an embodiment of the present invention, distributed objects are located on one or more computers linked together by a computer network such as the network illustrated at 100 in FIG. 2. As seen in the Figure, network 100 includes computer 102 which computer is coupled to a network 104. Network 104 can further include a server, router or the like 106 in addition to other computers 108, 110, and 112 such that data and instructions can be passed among the networked computers. The design, construction and implementation of computer networks will be familiar to those of skill in the art.

Figure 3:
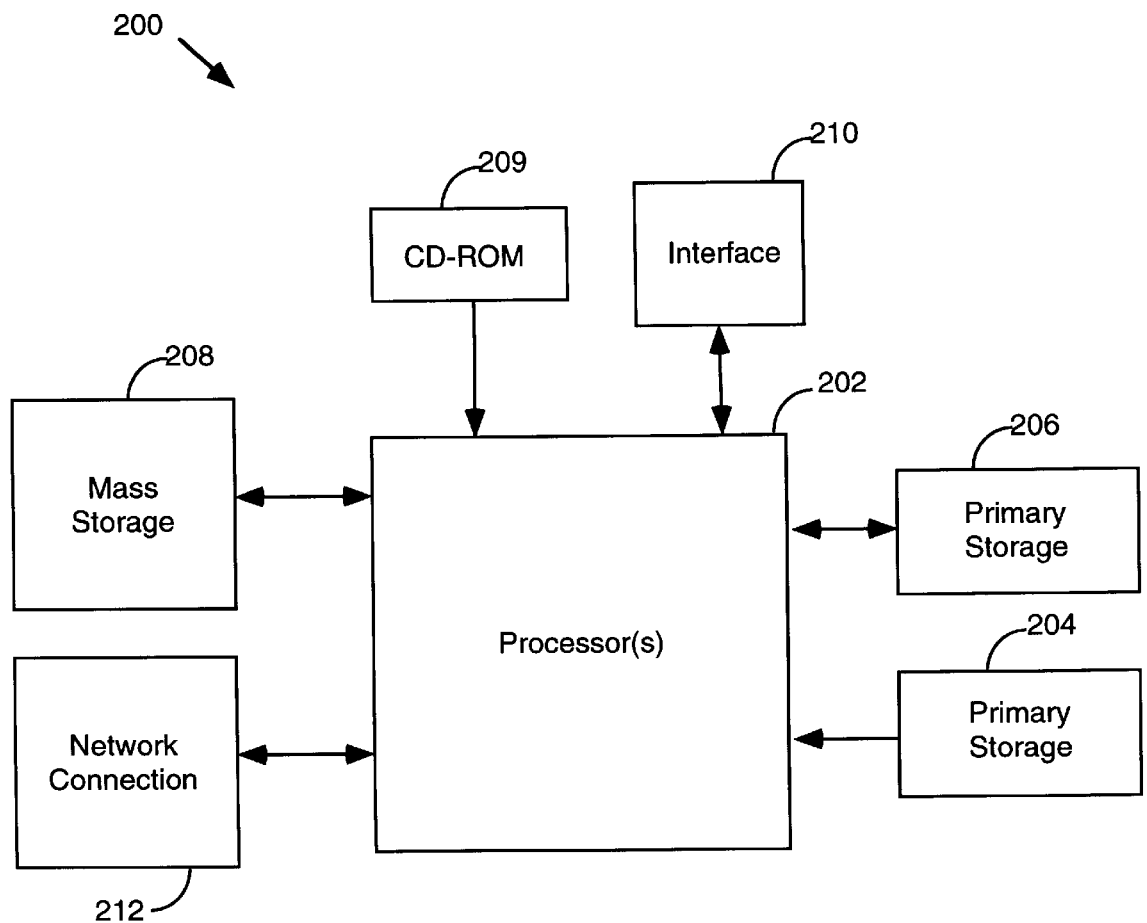
FIG. 3 is a schematic illustration of a computer system in accordance with the present invention.

Computers 102, 106, 108, 110, and 112 are illustrated schematically with respect to FIG. 3 at 200. The computer system 200 includes any number of processors 202 (also referred to as central processing units, or CPUs) that are coupled to storage devices including primary storage 206 (typically a random access memory, or RAM), primary storage 204 (typically a read only memory, or ROM). As is well known in the art, primary storage 204 acts to transfer data and instructions uni-directionally to the CPU and primary storage 206 is used typically to transfer data and instructions in a bi-directional manner. Both of these primary storage devices may include any suitable of the computer-readable media described above. A mass storage device 208 is also coupled bi-directionally to CPU 202 and provides additional data storage capacity and may include any of the computer-readable media described above. The mass storage device 208 may be used to store programs, data and the like and is typically a secondary storage medium such as a hard disk that is slower than primary storage. It will be appreciated that the information retained within the mass storage device 208, may, in appropriate cases, be incorporated in standard fashion as part of primary storage 206 as virtual memory. A specific mass storage device such as a CD-ROM 209 may also pass data uni-directionally to the CPU.

CPU 202 is also coupled to an interface 210 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 202 optionally may be coupled to a computer or telecommunications network using a network connection as shown generally at 212. With such a network connection, it is contemplated that the CPU might receive information from the network, or might output information to the network in the course of performing the above-described method steps. The above-described devices and materials will be familiar to those of skill in the computer hardware and software arts.

2. Code Generator for the Construction of Applications to be Installed on Distributed Object Systems FIG. 4 at 400 illustrates schematically one embodiment of a system for composing and installing object-oriented applications in a distributed object system. The illustrated system includes a composition builder 402 (also referred to as a "visual application builder") which the user, typically a programmer, employs to compose applications for installation on the distributed object system such as that shown in FIG. 1 described above. One embodiment of such a composition builder is described in co-pending U.S. patent application Ser. No. 08/675,850 filed on even date herewith and incorporated herein by reference for all purposes. The composition builder is coupled with a component service 404, described in greater detail below, that provides the user or programmer access to objects available on the distributed object system. Composition builder 402 is further coupled to a code generator 408 which, in conjunction with program template repository 406, takes the composition created by the composition builder and produces program source files as shown at 410.

Programs source files 410 are then forwarded to an Object Development Facility (ODF) compiler/linker 414 which is described in the above-incorporated U.S. patent application Ser. No. 08/414,240. In addition, ODF compiler/linker 414 is coupled with object access software 412 that in turn is coupled to component service 404. ODF compiler/linker 414 produces both object software 416 and network applications 418 which in turn access network objects 422 as shown generally at 420. These network objects can then be employed by the object access software 412 either for use in the component service 404 or in conjunction with the ODF compiler/linker 414 as indicated by the dashed arrows. Object access software 412 may typically be proscribed header files or a proscribed application programming interface (API) that are made available to a client, and may also include access to factory services.

Figure 4:
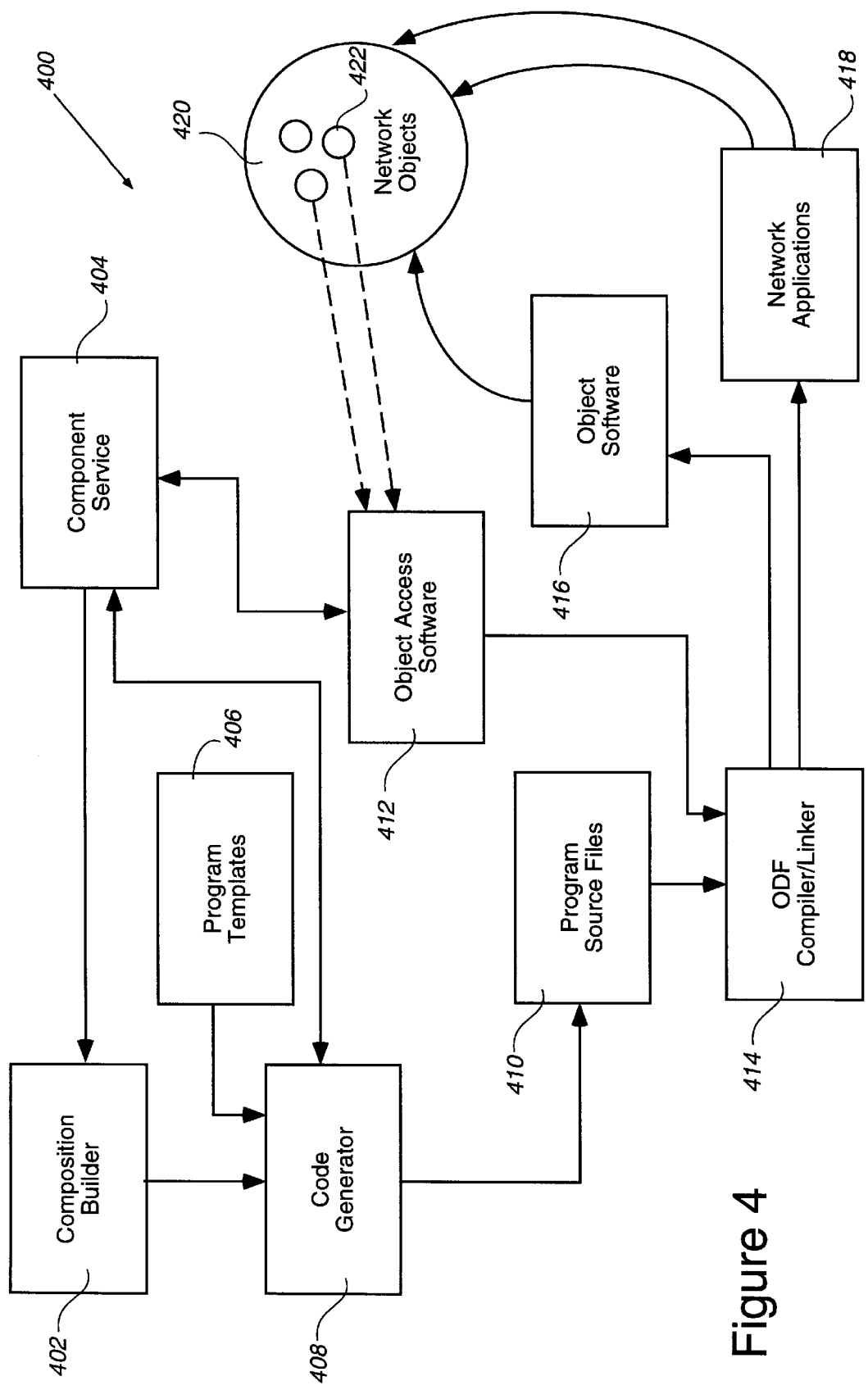
FIG. 4 is a schematic illustration of a system for constructing object-oriented applications in a distributed object system in accordance with the present invention.

These elements of FIG. 4 will now be described in greater detail. The composition builder 402 allows an application developer to visually construct an application program using distributed objects. A catalog of existing and previously defined objects is provided so that the developer may easily identify and retrieve remote objects for use in developing new software applications. Additionally, these objects may be reused within the Builder when forming new objects, thus permitting the reuse of code. When an object is selected for use within the Builder it may provide certain services or it may require services for its own use. By way of example, an object may have attributes that may take values, and may have operations (or methods) that require arguments and return results. Services required by an object may be values for its attributes and argument values for its operations. Likewise, services provided by an object may be its attributes that already have values and the results of operations. When building an application, services supplied by one object may be "connected" or delivered to an object that needs those services for processing. For example, the value of an attribute for one object may be used as an argument for an operation of another object. It is important for the purpose of connecting objects to be able to determine which services are provided by a given object and which services are needed by a given object.

In an embodiment of the present invention, the terms Component, Part, Plugs, Sockets and Connections have the following meanings. A Component represents an object (or object type), the service it provides, its implementation, and its name in the distributed object system naming service. As described in greater detail in above-referenced U.S. patent application Ser. No. 08/675,563, components a represent in a component catalog from which a user can examine and choose components to be applied to the application being built. When the user adds a component to the application under construction, a builder mechanism derives apart using the information contained in the component using the methods and mechanisms described herein. A part is a place holder for a future run-time instance of the object represented by the component, and may be treated as the run-time instance for the purposes of establishing connections with other objects and defining property values. When the completed application is processed by the builder, code is generated to represent the part and the actions it performs in relation to other objects in the application. The representation of the part is a place holder for a run-time instance of the object. Thus, when the application finally runs, a run-time instance of the object will be located or created and substituted for the part.

In one embodiment, each part has Plugs and Sockets that may be represented visually by a single plug icon or socket icon respectively. As described above, an object may require values for its attributes and argument values for its operations. A Plug is used to represent such needed services by an object. Other services may also be represented by a plug as will be appreciated by one skilled in the art of distributed object systems. By way of example, a plug represents an attribute of a part or an argument for that part that needs to be filled by a value. In addition, a plug may represent an argument of the component's factory method. These arguments are used by the component's factory method to produce a runtime instance of the part.

Likewise, any services provided by an object may be termed a Socket. By way of example, a socket may represent an attribute of a part that already has a value or an operation that returns a value. Thus, a socket provides services that are needed by a plug. It is contemplated that many different types of values may be used to fill the value needed by a plug and that sockets may have different types. By way of example, values that are object types may be used. Thus, the complementary nature of plugs and sockets will be seen to allow communication between objects that request services and objects that supply requested services. In one embodiment, such communication is represented by a connection that is made between a plug associated with a first part and a socket on a second part.

As described above, the composition builder 402 is used by a developer to create a model of a distributed object application. This model is termed a composition, and is formed in a composition worksheet of the composition builder. This composition may be thought of as a schematic representation of a distributed object application. This composition includes elements such as parts, plugs, sockets, connections, in addition to top-level information such as the name of the interface being defined and its module. All of these elements supply values to be loaded into a symbol table that is described below.

Typically, an implementation of an object is created in the Builder using other preexisting objects available through the component service 404. More precisely, the component service provides components that are connected symbolically in the composition worksheet. The composition does not include actual objects, but rather references to types of objects. The actual objects that are referenced will be substituted at the run time of the application. The component service is the set of interfaces used to describe components to the Builder and its tools.

The composition created in the Builder, when finished, typically includes various "pieces" that are then sent to the code generator 408 for transformation into code that may be compiled. The composition includes: an extensive graph of parts, plugs, sockets and components that the developer wishes to use, a detailed definition of the interface of the object that is being built in the composition worksheet, and possibly source code written by the developer to implement methods that he or she as defined upon the object being built. These "pieces" are the raw material that is sent to the code generator upon execution of a "build" command from within the composition builder.

Preferably, the code generator accesses the composition through a composition service.

The composition service is the set of interfaces used to record the contents of a particular composition. A composition is the main "document" underlying a composition that is edited in the builder. Because the application program interface (API) of the code generator is a network object, upon a "build" command, the code generator is handed an object reference to the complete composition along with the appropriate program templates from the program template repository. And when the code generator has requests for information from the composition service, it may access this information by making an appropriate call through the object reference of the composition service.

One decision the developer makes early on is whether a client or server is to be built.

That is, the composition builder may be used to build a client or server object, but the developer explicitly makes that choice. Once that choice is made, the program template repository 406 will then be able to provide templates for either a client or a server. The program templates are files that lay out a skeleton of what a client or a server should look like, but do not have any application specific code, because they have not yet been combined with the desired composition from the composition builder. As will be described in more detail below with reference to FIGS. 5 through 12, the code generator then turns this composition into an application program in the form of program source files 410.

The program source files are fed into the ODF 414 that may have two possible outputs. The ODF may produce network applications, i.e., "front-end" software that runs within a distributed object system, or it may produce object software 416. Object software 416 is software that may be run to access objects, and is not necessarily an application. In one embodiment, an interface of an object is defined in an interface definition language (IDL). This IDL is program-ming language independent. This IDL is fed into the ODF 414 to produce the object software 416, which is programming language dependent software that provides access to the attributes and operations defined upon the object defined in IDL. That is, object software 416 may be seen as a software library that is used by a distributed object application to access objects that are defined in IDL.

Figure 5:
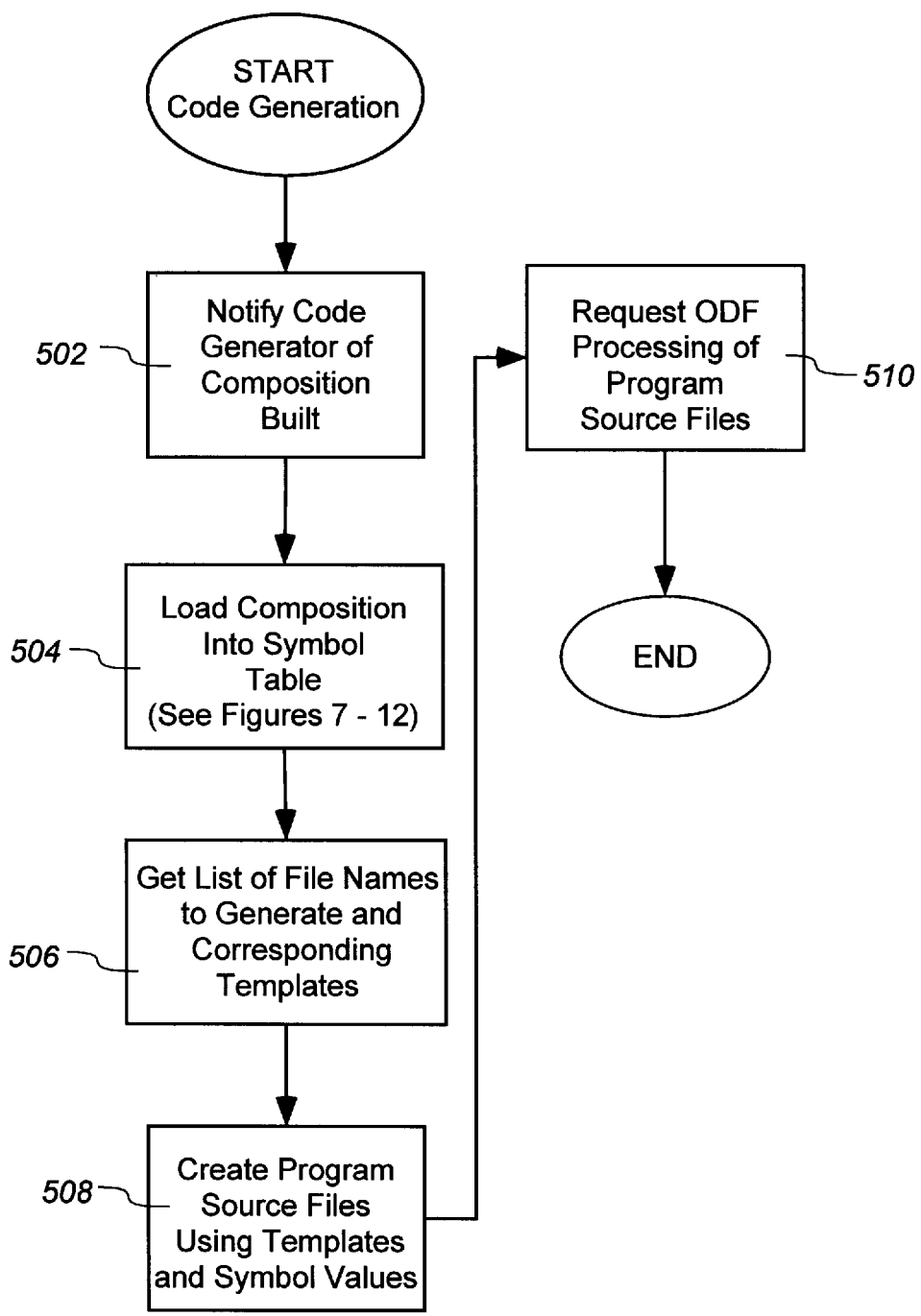
FIG. 5 is a flow chart of a method for automatically generating code for a network application in accordance with the present invention.

FIG. 5 now illustrates broadly the generation of distributed object code in accordance with one embodiment of the invention. Following the construction of a composition, the completed composition is forwarded to the code generator. The code generator is a "faceless" client of the component and composition services. Its job is to produce code that may be compiled from the composition and component data. The code generator produces program source files. For each program source file to be generated, preferably there is a corresponding template file that is a map of the result with metasymbols that the code generator replaces by actual code. The code generator will use a symbol table as further described below to assist in replacing the metasymbols. In other words, the code generator uses the program template files and the symbol table to generate these program source files. In one embodiment of the invention, the program source files are C++ source files, and for a distributed object application entitled "composition", these source files include files "composition.cc", "composition.hh", "main.cc" and an "Imakefile".

Beginning at step 502 the code generator of the invention is first notified of a composition that has been built. Typically, this happens when the developer has finished a composition and issues a "build" command. In one embodiment, the composition is built in conjunction with the visual application builder described in co-pending U.S. patent application Ser. No. 08/675,850 which is used together with a catalog of distributed object components such as described in co-pending Next, at step 504, the code generator loads the composition into a symbol table. The use of a symbol table in conjunction with creating distributed object applications from compositions provided by the Builder will be described in greater detail below. Basically, the loading step takes identifiers (sometimes called keys or variables) from the composition an d maps them into corresponding values. The value for each identifier is stored by way of the symbol table and each identifier-value pair is termed an entry in the symbol table. Each value may be a symbol table, an integer, a string, or a vector of strings. These identifiers that are mapped to values in the symbol table allow a program template to access the symbol table and substitute for its own identifiers the appropriate values in order to create a program source file. In other words, the step of loading a composition "seeds" the symbol table with the identifiers and values that will be used by the program templates.

Next, as indicated at step 506, the list of file names to generate is retrieved from the composition along with the corresponding list of templates. Preferably, one template is associated with each file name. This list of file names is made implicitly in the composition. That is, the developer implies which set of templates will be used by initially choosing whether to build a client or a server. The templates will be combined with values in the symbol table in order to produce these files that are desired to be generated. Following the loading of the composition into the symbol table and the retrieval of file names and corresponding templates, at step 508 program source files are created using these templates and the symbol values from the symbol table. Preferably, one source file is generated per template. This step will be explained in more detail below with reference to FIG. 6 and following. Finally, once the source files have been created the resulting files may be forwarded to an object development facility (ODF) as shown in step 510. One such object development facility is described in greater detail in co-pending U.S. patent application Ser. No. 08/414,240. The ODF is used to compile and link the files into an executable form.

Figure 6:
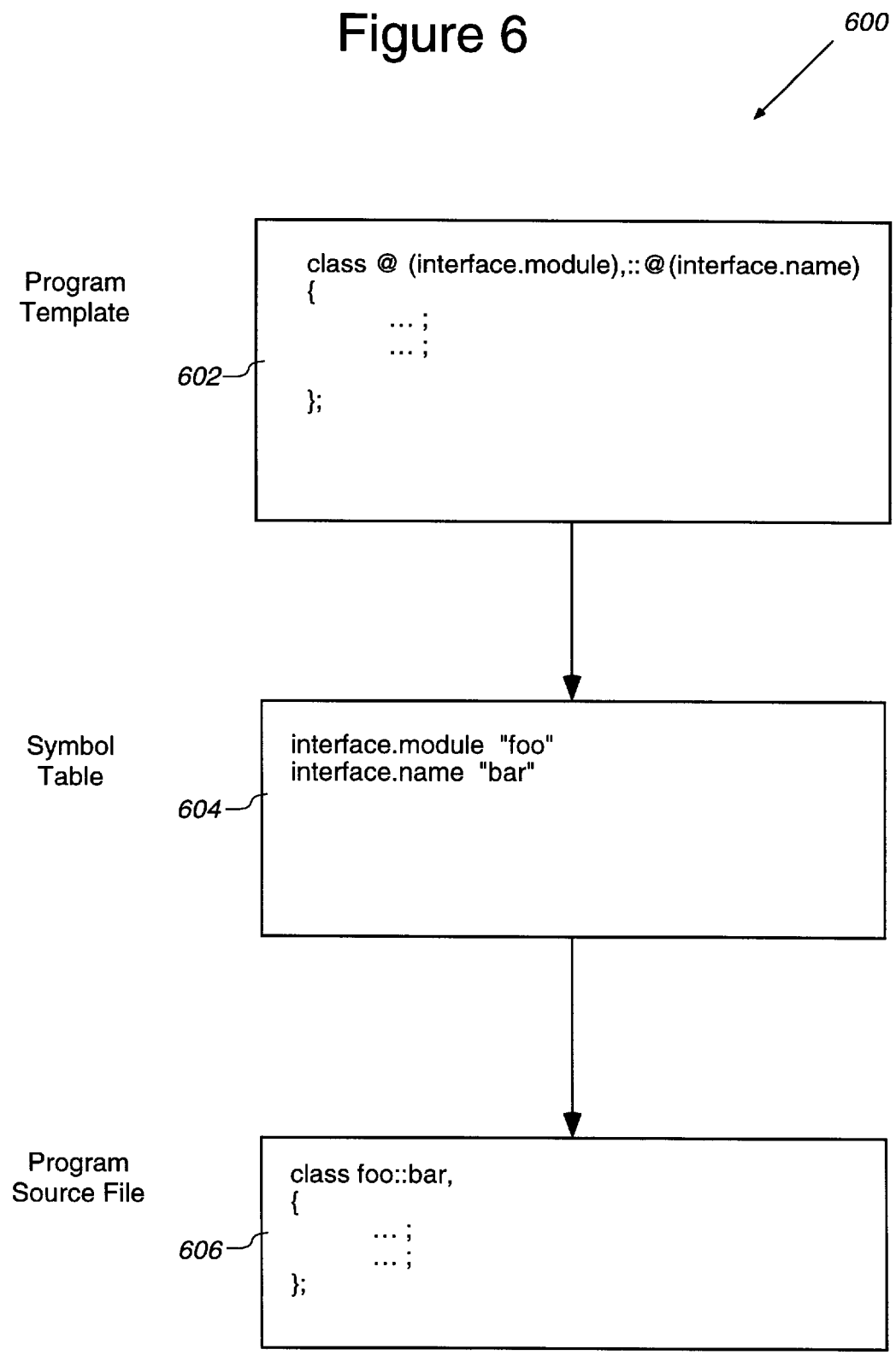
FIG. 6 is an illustration of the combination of a template and symbol table information to generate a source file in accordance with one embodiment of the present invention.

FIG. 6 at 600 illustrates the combining of a program template 602 with a symbol table 604 to generate a program source file as shown at 606 according to one embodiment of the present invention. In general, a template provides a "map" of the resulting source file. Portions of the template will be copied literally into the source file (such as generic headers), and other portions such as identifiers will be replaced with values from the symbol table. This replacement occurs as an identifier is looked up in the symbol table and its associated value is substituted (sometimes termed "macro-substitution"). In the example, an interface for the server object to be generated needs to be defined. A skeleton outline for such a server is provided in the template 602. In one embodiment, template 602 includes generic headers such as those used to define procedure calls and method routines. As shown at 602, one such header is the line "class @(interface.module)::@(interface.name)". The "@"symbol indicates that the identifier following it is to be replaced by a value identified in the symbol table. Thus, in the illustrated example, the line "class @(interface.module)::@(interface.name)" of the template is combined with values from the symbol table. The symbol table 604 has entries that give values to identifiers. In this example, the identifier "interface.module" has the value "foo" and the identifier "interface.name" has the value "bar". The entries in the symbol table are combined with the template to generate the source file that will contain the code "class foo::bar".

It should be appreciated that more sophisticated substitutions may also be made, and need not be limited to the form or particular syntax shown in these illustrative examples.

By way of example, the following provide additional illustrative examples of how substitution may be performed. As noted above, the code generator produces program source files given template files and a symbol table. Template files contain special forms, introduced preferably by an "@"prefix, that are replaced by values from the symbol table.

Other information in the template file is copied literally to the output file. For example, given a template file that contains the line:

My @(animal) has @(insect).
and a symbol table, "st", that has been initialized like this:
st.setValue("animal", "dog");
st.setValue("insect", "fleas");
The code generator would produce:
My dog has fleas.

The special form "@(identifier)" is replaced by the value of identifier in the symbol table. Identifiers may be arbitrary sequences of characters. Identifiers represent paths, where components of the path are separated by a period. Each path component is retrieved from the symbol table separately, the value of all but the last component is a symbol table. For example, the value of @(foo.bar) is retrieved by looking up the value of "@(bar)" in the symbol table that is the value of @(foo). In this fashion, the "symbol table" may be viewed as a tree of symbol tables that are indexed by path name components separated by a delimiter, as for example a ".".

In another example, given a template file like this:
The big @(story.homeowner) wanted to eat @(story.protagonist).
and a symbol table, "st", that has been initialized like this:
CG::SymbolTable *story=new CG::SymbolTable;
story.setValue ("homeowner", "brown bear");
story.setValue ("protagonist", "Goldilocks");
st.setValue ("story", story);
The code generator would produce:
The big brown bear wanted to eat Goldilocks.

The symbol table may also be initialized in a simpler fashion because implicit symbol tables are generated automatically:
st.setValue("story.homeowner", "brown bear");
st.setValue("story.protagonist", "Goldilocks");

The value of a symbol table entry may be a symbol table, an integer, a string, or a vector of strings. Integer valued symbol table entries may also be used in @if/@else expressions.

A non-zero value is true, e.g.:
@if(flag) Hi Ho @else Hi No
yields "Hi No" if the value of flag had been initialized like this:
st.set.Value("flag", 0);
"Hi Ho" otherwise. The code generator also supports "@elseif" clauses with the usual semantics.

Vector valued symbol table entries are used with the @foreach form:
The letters are: @foreach (letter all-letters) @(letter) @end.
If the symbol table has been initialized like this:
CG::StringVector v;
v.insert("letterA");
v.insert("letterB");
v.insert("letterC":);
st.setValue("all-letters", v);
st.setVAlue("letterA", "A");
st.setVAlue("letterB", "B");
st.setVAlue("letterC", "C");
then the code generator would produce:
The letters are: A B C.

The body of the @foreach clause is translated once for each item in the named string vector. The (string) values of each element of the vector are bound to the @foreach loop variable which can be used in identifiers within the body of the loop. When a loop variable is encountered in an identifier, it is replaced by its value and the resulting identifier is retrieved from the symbol table. For example, in the first iteration of the loop the value of letter is "letterA", so @(letter) becomes @(letterA) which yields "A".

Inside the body of an @foreach loop, three additional variables are bound for each element of the string vector: var:index, var:is-first, and var:is-last. Their values are the integer index of the vector element that is currently bound to loop variable "var" and an integer flag that is "1" if the first or last vector element is bound. Given the same ABC symbol table as before:

@foreach(letter all-letters)
    int @(letter) = @(letter:index) @if(letter:is-last);@else, @end @end the code generator would produce:
A=1, B=2, C=3;

Sometimes it is useful to be able to construct a C identifier with one or more @if/@else/@end or @foreach/@end expressions. In this case, the code generator treats @{else} and @{end}like @else and @end. So one may write:

FOO@if(NEVER)HOOOO@{else}BAR@{end}BAZ and assuming that "never" was bound to "0" the code generator would produce "FOOBARBAZ", as expected.

The code generator is a general purpose code generator. Preferably, it is intended to be used for generating C++/ Objective-C sources and headers, and Imakefiles. Also, identifier components may be doubly indirect, as in:

@foreach (var list) list element @(var) is:
@(foo.var.value)

where @(var) is looked up once to produce a new identifier path, such as @(foo.bar.value), and then the value of the complete path is retrieved.

In general, the template files canonically represent a distributed object application. It will be appreciated by those of skill in the art that a wide variety of template forms are possible due to the wide variety of distributed object systems and possible distributed object applications. By way of example, particular examples of template forms have been presented above. And for creating a distributed object application, one preferable set of program templates are provided in the attached Appendix.

Figure 7:
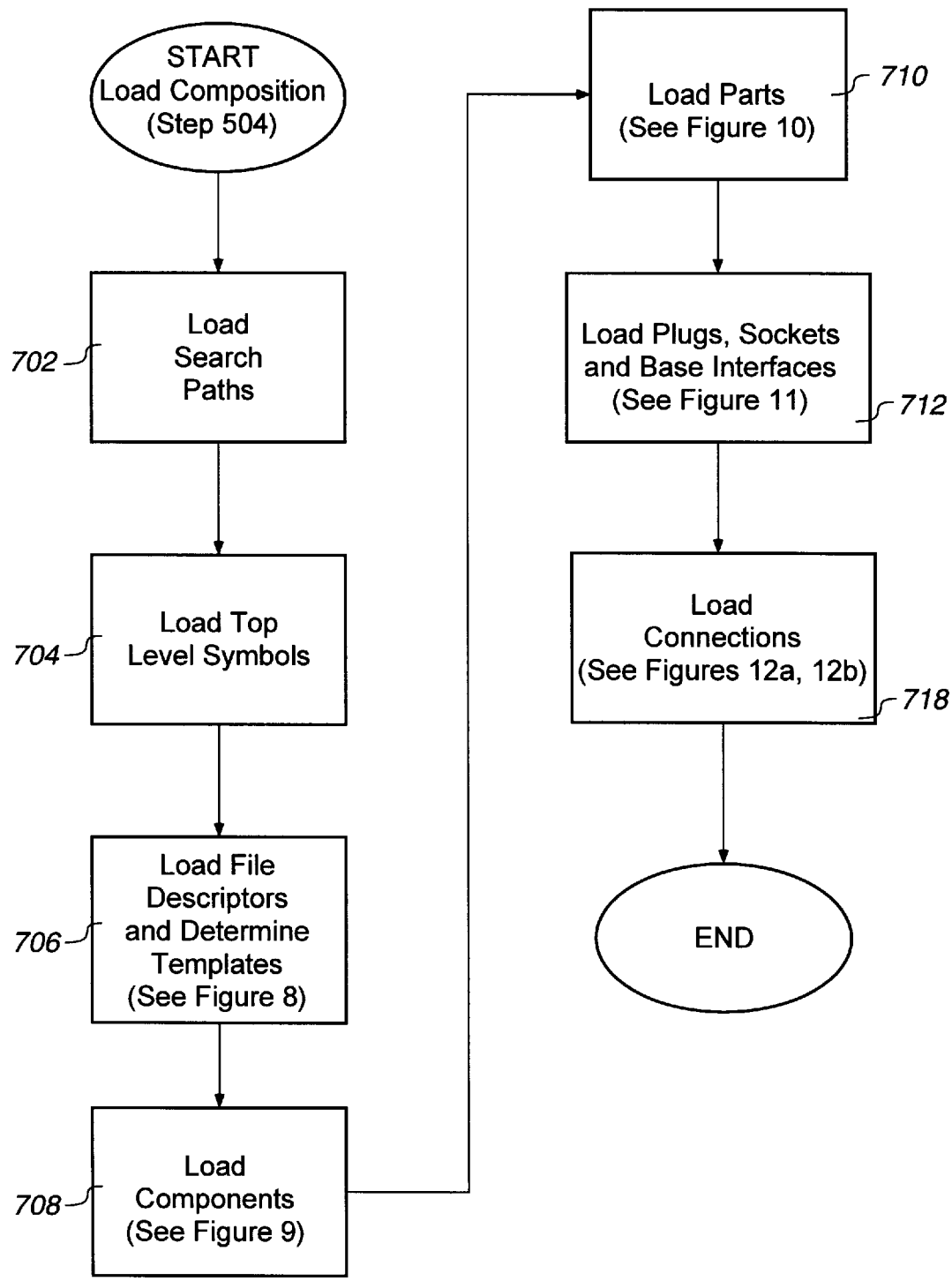
FIG. 7 is a flow chart of step 504 of FIG. 5 in which the composition representing a network application is loaded into a symbol table according to one embodiment of the present invention.

Returning now to the figures, FIG. 7 illustrates one embodiment of the construction of a symbol table as indicated at step 504 of FIG. 5. At step 702 the search paths are loaded for later use by the compilation tools. These search paths are a list of directory and file names for the files that are used by the code generator. As part of this step, the component service may merge certain components. For example, two different components may each be using the same header file, storing information in the same search path. At step 704 the top-level symbols to be placed into the symbol tree are loaded. These top-level symbols are the global names associated with each and every composition. A wide variety of top-level symbols might be loaded into the symbol table tree. By way of example, these top-level symbols include the interface name, the interface module, a list of all parts, a list of all components, and in general, any symbol not associated with a particular part, plug, or socket of a composition.

Next, in step 706, file descriptors of the files associated with the composition are loaded and the appropriate templates among them are determined. This step will be explained in more detail below with reference to FIG. 8. At step 708 the components defined in the composition are loaded. This step may be accomplished by requesting of the component service a list of all components that are referenced by the parts in the composition. This step will be explained in more detail below with reference to FIG. 9. Once the components have been loaded, step 710 loads the parts corresponding to these components. This step will be explained in more detail below with reference to FIG. 10. In step 712 the plugs, sockets and base interfaces defined in the composition are loaded. This step will be explained in more detail below with reference to FIG. 11. In step 718, the connections are loaded, and this step will be explained in more detail below with reference to FIGS. 12a and 12b.

Figure 8:
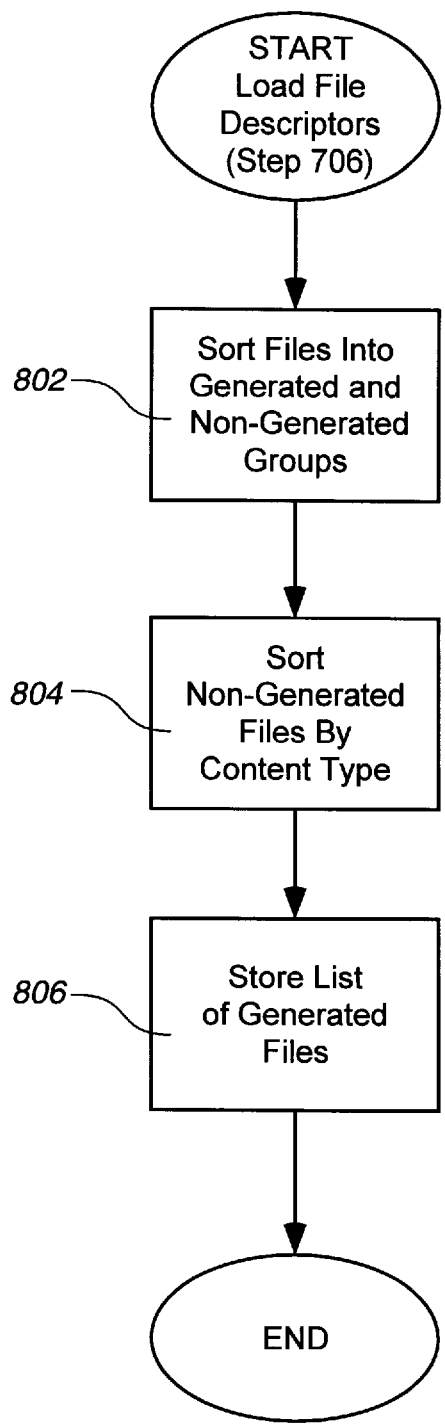
FIG. 8 illustrates step 706 of FIG. 7 in greater detail in which file descriptors are loaded into a symbol table according to one embodiment of the present invention.

FIG. 8 illustrates step 706 in greater detail. This step loads the file descriptors for the various files associated with the composition and determines which files are templates. The files descriptors categorize the files into types based upon two dimensions. Firstly, files may be categorized by what they contain. Files might contain declarations, definitions, interface definition language (IDL) code, etc. Additionally, files may be categorized by where they originate. In a first category, files might be generated by the code generator; these files contain a flagged template that indicates the appropriate template to use to produce that file. In a second category, certain files are provided by the developer and may contain source code (such as C++) that has been provided by the developer to implement defined methods. In a third category are files that are merely cross-references to object access software 412 of FIG. 4. These cross-references provide a technique by which the code generator may find out about available files in the object access software. Starting at 802 the files are sorted into generated and non-generated groups. At step 804 the non-generated generated files are further sorted by content type. This is useful because some of the program templates refer to non-generated file names by type. For example, the Imakefile template does this.

At step 806 the list of generated files is then stored. This list of generated files will be accessed and used in step 506 of FIG. 5 when a list of files to be generated is needed.

Figure 9:
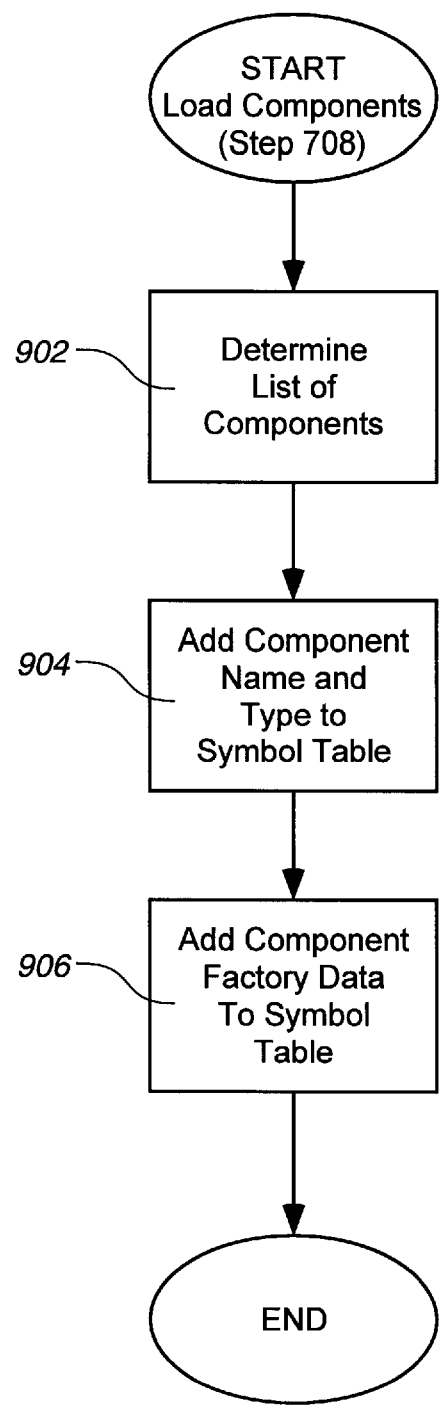
FIG. 9 illustrates step 708 of FIG. 7 in greater detail in which components are loaded into a symbol table according to one embodiment of the present invention.

FIG. 9 illustrates step 708 of FIG. 7 in greater detail. This step loads the components referenced in a composition into the symbol table. Beginning at step 902 the list of components is determined. This step is performed by the component service by scanning all the parts, plugs, sockets and other elements used in the composition in order to produce a list of all components that are used by these parts, plugs and sockets. Because several parts may use the same component, a small amount of processing is necessary in order to produce a list that is not duplicative. At step 904 the component names are added to the symbol table along with their corresponding types. At step 906 component factory data is then added to the symbol table. Because a component factory is a complex type, the data may include several elements. These may include the type of the factory's creator, the name of the creator and the name that the factory is registered under in the naming service. A factory is used at run time in order to create an instance of a component. The run time code will look up the appropriate factory in order to create an instance.

Figure 10:
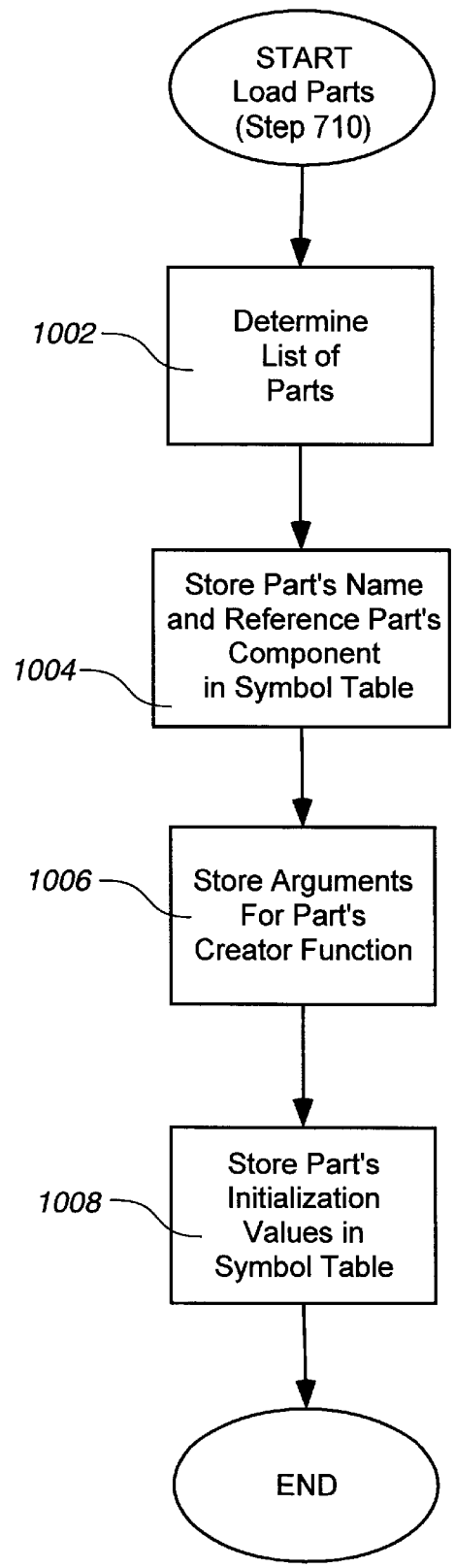
FIG. 10 illustrates step 710 of FIG. 7 in greater detail in which parts are loaded into a symbol table according to one embodiment of the present invention.

FIG. 10 illustrates in greater detail step 710 of FIG. 7. This step loads all of the parts used in a composition into the symbol table tree. Beginning at 1002, a determination of the list of parts is made. This step may be performed by requesting of the composition service a list of all parts that are used. Next, in step 1004, the part's name is stored in the symbol table along with a cross-reference to the part's component. Because a symbol table entry for each component has been created in FIG. 9, the names of these symbol tables may be stored in order to cross-reference each part's component. At step 1006 the arguments for each part's creator function are stored. Each component has a factory, which in turn has a creator function. More precisely, then, step 1006 stores arguments for each part's component's factory's creator function. In this step a symbol table entry is created whose value is a symbol table that maps to a collection of all arguments needed by the factory's creator function. This collection of arguments is a set of values that is needed when generating code to call that factory function. At step 1008, the part's initialization values are stored in the symbol table. Each property of a part has an initial value that is set in this step.

Figure 11:
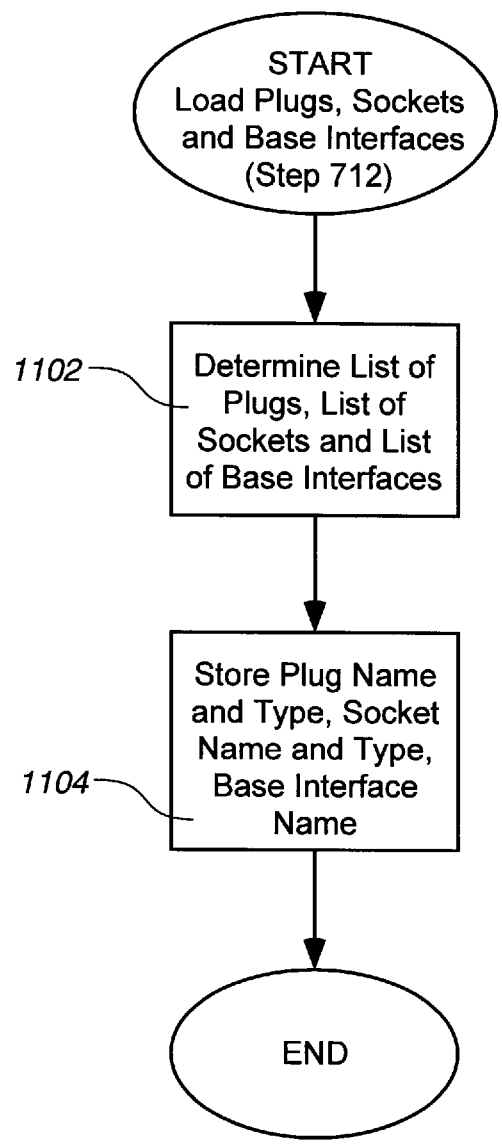
FIG. 11 illustrates step 712 of FIG. 7 in greater detail in which plugs, sockets and base interfaces are loaded into a symbol table according to one embodiment of the present invention.

FIG. 11 further illustrates step 712 of FIG. 7. In this step, all of the plugs, sockets and base interfaces used in the composition are stored in the symbol table. First, the list of plugs, the list of sockets and the list of base interfaces are determined at step 1102. These lists may be determined by reference to the composition service. Once all of these elements are determined, then, in step 1104, the name and type of each plug, the name and type of each socket, and the name and type of each base interface is stored in the symbol table.

The type of a plug or socket is the interface definition language (IDL) type of the object that is passed through the socket, or that is received by the plug. It is the type of the object that is being connected to. A base interface is an interface that is not derived from another interface. In other words, interfaces that are not base interfaces are derived interfaces.

Figure 12A:
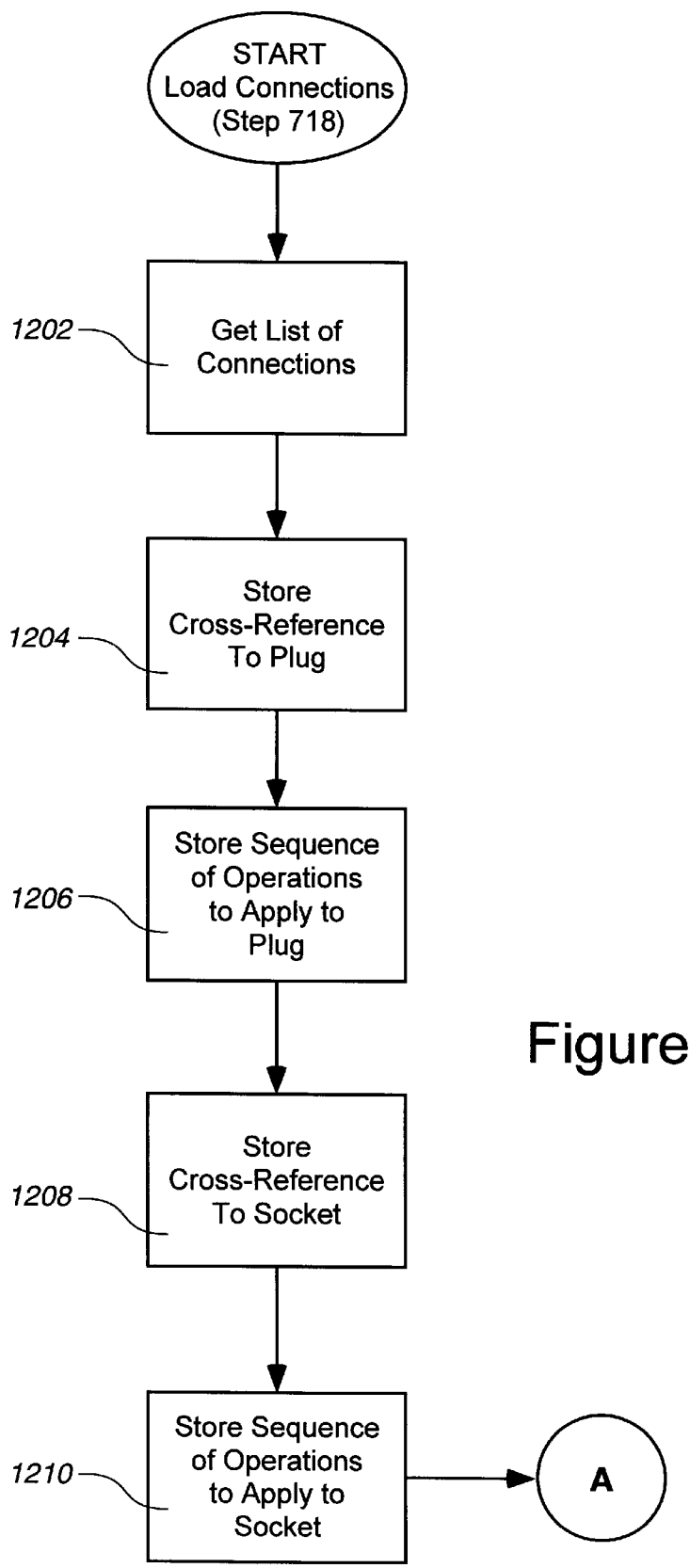
FIGS. 12a and 12b illustrate step 718 of FIG. 7 in greater detail in which connections are loaded into a symbol table according to one embodiment of the present invention.
Figure 12B:
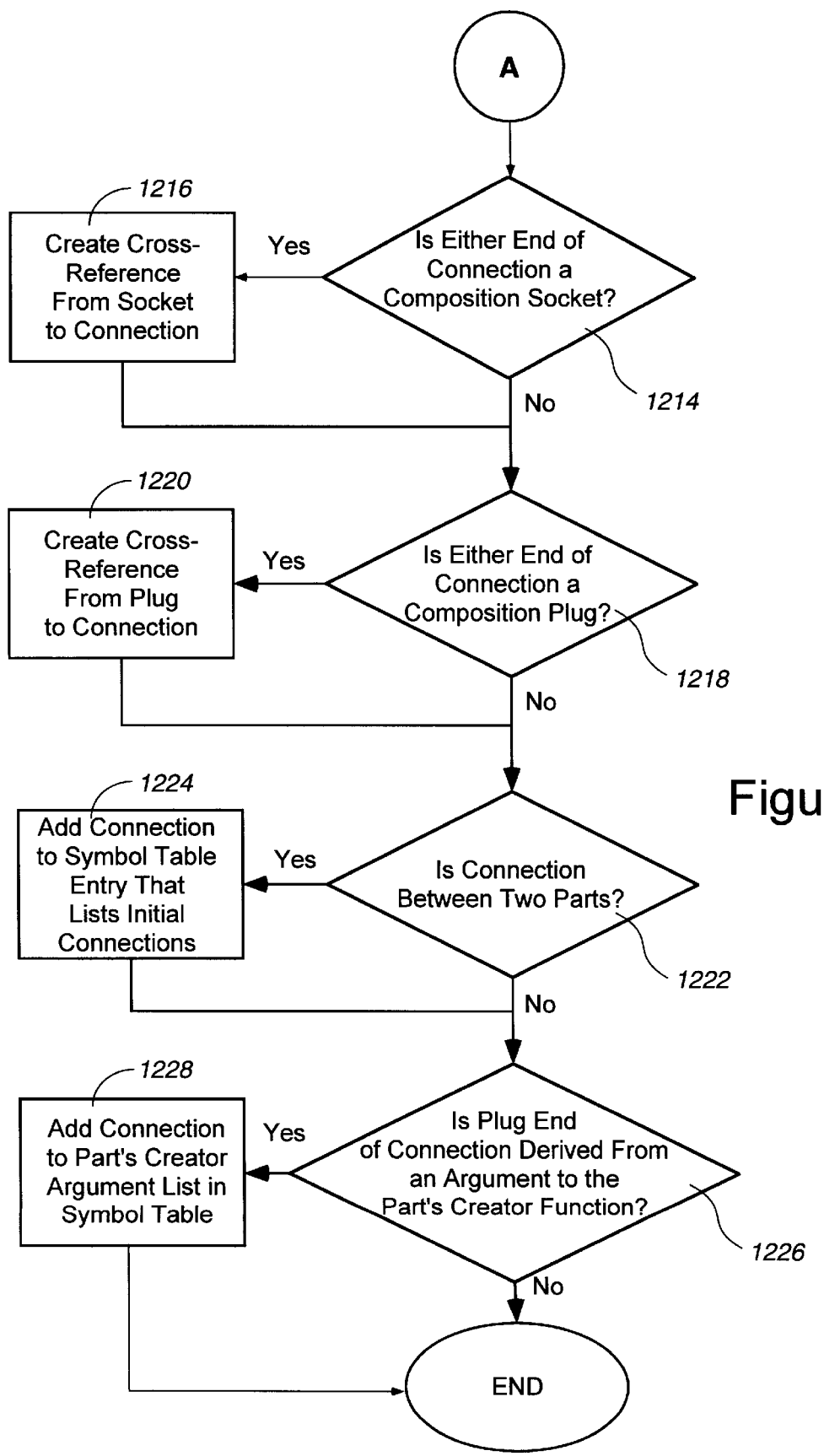

FIGS. 12a and 12b illustrate in detail step 718 of FIG. 7 according to one embodiment of the present invention. This step loads the connections from the composition into the symbol table. Connections are formed by the developer while building an application in the composition builder. A connection may be from a socket of one part to a plug of another part. In the convention used, a socket provides an object for use by a plug which needs an object. An analogy may be drawn to an electrical socket and plug. When an electrical plug is inserted into an electrical socket, the socket provides electricity to the plug. Similarly, at run time, a connection can be seen as passing an object reference from a socket to a plug. Additionally, a connection may be from a composition socket to a part, or a connection may be from a composition plug to a part. A "composition" socket or plug provide outside access from within the composition. In other words, The composition sockets and plugs are the public IDL interface of the composition.

Beginning at step 1202 the list of connections is obtained from the composition service. Once this list of connections is obtained, then the following steps 1204 through the END are performed for each connection in order to properly load it into the symbol table. It should be noted that previously in FIG. 11 all of the plugs and sockets of the composition had been loaded into the symbol table. Also, although sockets are arranged to pass object references to plugs, these object references are not actually passed until the application is executing. Additionally, a sequence of operations must be applied to a socket at run time in order to extract the correct object reference. Also, another sequence of operations must be applied to a plug in order to pass this object reference to the plug. At step 1204 a cross-reference to the plug of the present connection is stored in the symbol table. Next, in step 1206 the sequence of operations that will apply to this plug are also stored in the symbol table. Thus, a program may be generated that will call this sequence of operations when appropriate.

An example of a sequence of operations is now described. A socket may be an operation of no arguments that returns a value, e.g., for an operation "part.get_value" takes no arguments and returns a value. The builder allows users to compose sequences of socket operations that may depend upon the value of a previous socket operation. For example, the operations:

```
Type1 var1 = part.get_value1();
Type2 var2 = var1.get_value2();
Type3 var3 = var2.get_value3();
``` define a sequence of operations with a final value of "var3."

At step 1208 a cross-reference to the socket of the present connection is stored in the symbol table. Next, in step 1210 the sequence of operations that will apply to this socket are also stored in the symbol table. Next, the connections are sorted in the following decision steps 1214, 1218, 1222 and 1226. The connections are sorted on the basis of whether either end of the connection is a socket (when a composition socket connects to a part), whether an end is a plug (when a composition plug connects to a part), whether a connection is formed solely between two parts (when a socket of one part is connected to the plug of another part), or whether a plug end of a connection is due to an argument to its part's creator function.

First, at step 1214, a determination is made as to whether either end of the connection is a composition socket. If the answer to step 1214 is "YES" then, at step 1216 a cross-reference from the socket to the connection is created in the symbol table. In this way, the reference is added to the description of the socket in the symbol table. In either case, at step 1218 a determination is made as to whether either end of the connection is a composition plug. If the answer at 1218 is "YES" then, at step 1220, a cross-reference is created from the plug to the connection and stored in the symbol table. Again, in either case flow moves to step 1222 at which point a determination is made as to whether the connection exists between two parts. If the answer to query 1222 is "YES" then, at step 1224, the connection is added to the symbol table entry that lists initial connections. These initial connections will be executed when the application first begins. If the answer at step 1222 is negative, flow moves directly to step 1226. Step 1226 is a determination as to whether the plug end of the connection is derived from an argument of its part's creator function. That is, each part corresponds to a component that has a creator function. If this creator function has arguments, these arguments form plugs of the part because they must be filled by an object value. If the plug end of the connection in question here in step 1226 exists because it is fills (is derived from) an argument of the part's creator function, then control moves to step 1228. At step 1228, the connection is added to the part's creator argument list in the symbol table. Following step 1228, or if the answer to the query at step 1226 is negative, the routine ends.

Although the foregoing invention has been described in some detail for purposes of clarity of understanding, it will be apparent that certain changes and modifications may be practiced within the scope of the appended claims. For instance, the code generator may generate code for any suitable distributed object system. And although a particular syntax has been shown for use in the program templates, any suitable syntax may be used. In addition, the symbol table shown and described has presented one possible way to associate an identifier with a value. It should be appreciated that identifiers may be associated with values in a wide variety of manners. Furthermore, although one particular order has been shown for loading elements into the symbol table, these elements may be loaded in any suitable order. Therefore, the described embodiments should be taken as illustrative and not restrictive, and the invention should not be limited to the details given herein but should be defined by the following claims and their full scope of equivalents.

P1279/SUN1P069/DrL/JOS

APPENDIX

This appendix contains examples of program templates suitable for creating a server object in a distributed object application according to one embodiment of the present invention.

```
# This file was generated by @(codegen-name) version @(codegen-version.
# Template is @(codegen-template.name), output @(codegen-output.name).
# Server Imakefile template
PARAM_ODF_DIR=/opt/SUNWdoe/include/odf
include $(PARAM_ODF__DIR)/Makefiles/Makefile.odf /* Note: use odfimake -I${DAB_DIR}/include */
include <nab/Makefiles/nab.imake>

SERVER_@(interface.name)_LIBS = @foreach(library libraries)
@(library.library-name) @end
SERVER_@(interface.name)_LIBPATH = @foreach(path library-run-paths)
@(path.name) @end
SERVER_@(interface.name)_RUNPATH = @foreach(path library-link-paths)
@(path.name) @end
BuilderServerProgram (@ (interface.name))
```

25

P1279/SUN1P069/DFL/JOS

```
   // This file was generated by @(codegen-name) version@(codegen-version).
   // Template is @(codegen-template.name), output @(codegen-output.name).
 5 // Server Implementation header file.

#ifndef _@(interface.name)Impl_NAB_HH
   #define _@(interface.name)Impl_NAB_HH

10 #include "@(interface.name)Impl.hh"

@foreach(source included-sources)
   #include "@(source.name)" @end 15 class Nab@(interface.name)Impl: public virtual ::@(interface.name)Impl {
   public:

@foreach(socket sockets)
     @(socket.type)Ref get_@(socket.name)() throw(::CORBA::Exception); @end
20
   @foreach(plug plugs)
     void set_@(plug.name)(@(plug.type)Ref x) throw(::CORBA::Exception);
   @end 25  void make_parts();
    void init_parts();

void _initialize_new_@(interface.name)();

30  @(interface.name)Impl();
    ~@(interface.name)Impl(); } ;

class NabFactoryImpl: public virtual ::FactoryImpl {
    public:
35  @(interface.module)::@(interface.name)Ref create_@(interface.name)()
    throw (::CORBA::SystemE:
     void _initialize_new_Factory();
     };
    #endif // _@(interface.name)Impl_NAB_HH
```

26

P1279/SUN1P069/DFL/JOS

```
   // This file was generated by @(codegen-name) version@(codegen-version).
   // Template is @(codegen-template.name), output @(codegen-output.name).
   // Server Implementation source file.
 5 #include "@(interface.name).hh"
   #include "odf_output/Odf@(interface.name).hh"

@foreach(S sockets)
   @(S.type)Ref Nab@(interface.name)Impl::get_@(S.name)()
10   throw(::CORBA::SystemException)
   {
    return @(S.connection.socket-name)@foreach(O
   S.connection.socket-operations)->@(O.name)@end
   } @end
15
   @foreach(plug plugs)
     void Nab@(interface.name)Impl::set_@(plug.name)(@(plug.type)Ref x)
   throw(::CORBA::SystemException)
   {
20   x->_duplicate();
     @(plug.name)->_release();
     @(plug.name) = x;

@foreach (C plug.connections)
25   @(C.plug-name)@foreach(O
   C.extractor-operations)->@(O)@end->@(C.plug-operation)(@
     (plug.name)
   @end
   }   @end
30
   void @(interface.name)::make_parts()
   {
      const char *F = DoeTrace:: facility;

35 @foreach(C components)
      ODF_ObjRef<@(C.factory.type)> @(C.name)_factory;
   @end const char *factory_name = "<no factory name>";
40 try {
      @foreach(C components)
         factory_name = "@(C.factory.service)";
         ODF_find(@(C.name)_factory, factory_name);
   @end
45 }
   catch(ODF::Service::Exception& e) {
      DOE_ERR(F, "can't find factory '%s': %s\n",
         factory_name,
         ODF::exception_to_string(e));
50   throw;
   }
   catch (CORBA::Exception& e) {

DOE_ERR(F, "exception, finding factory '%s':\n%s\n",
55      factory_name,
         ODF::exception_to_string(e));
   throw; }
```

27

P1279/SUN1P069/DRL/JOS

```
    const char *part_type = "<no part type>";
    try {

@foreach (P parts)
 5      part_type = "@(P.component.type)";
        @(P.name) =
   @(P.component.name)_factory->@(P.component.factory.creator)(
        @foreach(A P.creator-args)
          @if(A.is-connection)
10        @(arg.connection.socket-name)@foreach(O
   arg.connection.socket-operations)->@(O.name)
        @else
          @(arg.constant)
        @end
15      @if(A:is-last));@else,@end
      @end
    @end
    }
    catch (CORBA::Exception& e) {
20    DOE_ERR(F, "Can't create '%s':\n%s\n",
        part_type,
        ODF::exception_to_string(e));
      throw;
    }
25  catch (...) {
      DOE_ERR(F, "Can't create '%s'\n", part_type);
      throw;
    }
    }
30
    void Nab@(interface.name)Impl::init_parts()
    {
      const char *F = DoeTrace:: facility;

35   const char *init_name = "<no attribute name>", *part_name = "<no part
   name>";
      try {
        @foreach(P parts)
          part_name = "@(P.name)";
40        @foreach(I P.initializations)
            init_name = "@(I.name)";
            @(P.name)->@(I.name)(@(I.value));
        @end
      @end
45  }
    catch (::CORBA::Exception& e) {
      DOE_ERR(F, "Can't initialize '%s' in part '%s':\n%s\n",
        init_name,
        part_name,
50      ODF::exception_to_string(e));
      throw;
    }
    catch (...) {
      DOE_ERR(F, "Can't initialize '%s' in part '%s'\n",
55      init_name,
        part_name);
      throw;
    }
```

P1279/SUN1P069/DFL/JOS

```
   const char *connection_name = "<no connection>";
   const char *plug_terminal = "<no plug terminal>";
   const char *socket_terminal = "<no socket terminal>";
5  try {
      @foreach(C connections)
         plug_terminal = "@(C.plug-name)";
         socket_terminal = "@(C.socket-name)";
         connection_name = "@(C.name)";
10       @(C.plug-name)@foreach(O
      C.extractor-operations)->@(O)@end->@(C.plug-operation)(@
         (C.socket-name)
      @end
   }
15 catch (::CORBA::Exception& e) {
       DOE_ERR(F, "Can't exec connection [%s] '%s' = '%s'\n%s\n",
         connection_name,
         plug_terminal,
         socket_terminal,
20       ODF::exception_to_string(e));
    throw; } catch (...) {
      DOE_ERR(F, "Can't exec connection [%s] '%s' = '%s'\n",
25      connection_name,
        plug_terminal,
        socket_terminal)
      throw;
      }
30 } void Nab@(interface.name)Impl::_initialize_new_@(interface.name)()
   {
     make_parts();
35   init_parts();
   }

@(interface.module)::@(interface.name)Ref
     NabFactoryImpl::create_@(interface.name)()
40   throw(::CORBA::SystemException)
   {
     return Odf@(interface.name)Impl::new@(interface.name)();
   }

45 void NabFactoryImpl::_initialize_new_Factory()
   {}
```

P1279/SUN1P069/DFL/JOS

```
   # This file was generated by @(codegen-name) version @(codegen-version).
   # Template is @(codegen-template.name), output @(codegen-output.name).
   # Client Imakefile.

5 PARAM_ODF_DIR=/opt/SUNWdoe/include/odf
   include $(PARAM_ODF_DIR)/Makefiles/Makefile.odf INCLUDES.cc  += @foreach(path c++-include-paths) -I@(path.name) @end
   INCLUDES.m   += @foreach(path objc-include-paths) -I@(path.name) @end
10 INCLUDES.c   += @foreach(path c-include-paths) -I@(path.name) @end
   INCLUDES.idl += @foreach(path idl-include-paths) -I@(path.name) @end
   INCLUDES += \
       $(INCLUDES.cc) \
       $(INCLUDES.m) \
15     $(INCLUDES.c) \
       $(INCLUDES.idl)

CLIENT.cc = @foreach(path c++-sources) @(path.name) @end
   CLIENT.m  = @foreach(path objc-sources) @(path.name) @end
20 CLIENT.c  = @foreach(path c-sources) @(path.name) @end
   CLIENT.o = \
       $(CLIENT.m:%.m=%.o) \
       $(CLIENT.c:%.c=%.o) \
       $(CLIENT.cc:%.cc=%.o)
25
   CLIENT.so = @foreach(library libraries) @(library.library-name) @end
   CLIENT.Rpath = @foreach(path run-lib-paths) @(path.name) @end
   CLIENT.Lpath = @foreach(path link-lib-paths) @(path.name) @end 30 CLIENT_@(client-name)_OBJECTS = $(CLIENT.o)
   CLIENT_@(client-name)_LIBS = $(CLIENT.so)
   CLIENT_@(client-name)_LIBPATH = $(CLIENT.Lpath)
   CLIENT_@(client-name)_RUNPATH = $(CLIENT.Rpath)
   BasicClientProgram(@(client-name))
```

P1279/SUN1P069/DrL/JOS

```
   // This file was generated by @(codegen-name) version@(codegen-version).
   // Template is @(codegen-template.name), output @(codegen-output.name).
   // Client "main.cc" file.

5  #include "@(common-include)"

int main(int argc, char **argv, char **env)
   {
      try {
10       ODF::init(argv[0]);
      }
      catch (CORBA::Exception&) {
         fprintf(stderr, "Error: can't initialize ODF\n");
         return 1;
15    }

@(container-class) clientVar(argc, argv, env);
      return clientVar.run();
   }
20

// This file generated by @(codegen-name) version @(codegen-version).
   // Template is @(codegen-template.name), output @(codegen-output.name).
25 // Client Implementation header file.

#ifndef _@(container-class)_HH
   #define _@(container-class)_HH

30 #include <odf/odf.hh>

@foreach(source included-sources)
   #include "@(source.name)"
   @end
35
   class @(container-class) {
   public:

@foreach(part parts)
40    ODF_ObjRef<@(part.component.type)> @(part.name);
   @end void make_parts();
      void init_parts();
45    virtual int run();

@(container-class)(int argc, char **argv, char **env);
      ~@(container-class)();
   };
50
   #endif // _@(container-class)_HH
```

P1279/SUN1P069/DFL/JOS

```
   // This file was generated by @(codegen-name) version@(codegen-version).
   // Template is @(codegen-template.name), Output @(codegen-output.name).
   // Client implementation source file.

5 #include "@(common-include)"

@(container-class)::@(container-class)(int argc, char **argv, char
   **env)
   {
10   make_parts();
     init_parts();
   }

@(container-class)::~@(container-class)()
15 {
   } void @(container-class)::make_parts()
20 {
     const char *F = DoeTrace:: facility;

@foreach(C components)
         ODF_ObjRef<@(C.factory.type)> @(C.name)_factory;
25   @end const char *factory_name = "<no factory name>";
     try {
       @foreach(C components)
30       factory_name = "@(C.factory.service)";
         ODF_find(@(C.name)_factory, factory_name);
       @end
     }
     catch(ODF::Service::Exception& e) {
35
       DOE_ERR(F, "can't find factory '%s': %s\n",
          factory_name,
          ODF::exception_to_string(e));
       throw;
40   }
     catch (CORBA::Exception& e) {
       DOE_ERR(F, "exception, finding factory '%s':\n%s\n",
          factory_name,
          ODF::exception_to_string(e));
45     throw;
     } const char *part_type = "<no part type>";
     try {
50     @foreach (P parts)
         part_type = "@(P.component.type)";
         @(P.name) =
     @(P.component.name)_factory->@(P.component.factory.creator)(
         );
55     @end
     }
     catch (CORBA::Exception& e) {
        DOE_ERR(F, "Can't create '%s':\n%s\n",
```

32

P1279/SUN1P069/DPL/JOS

```
         part_type,
         ODF::exception_to_string(e));
      throw;
      }
 5  catch (...) {
         DOE_ERR(F, "Can't create '%s'\n", part_type);
         throw;
      }

10  void @(container-class)::init_parts()
    {
       const char *F = DoeTrace:: facility;

const char *init_name = "<no attribute name>", *part_name = "<no part
15  name>";
       try {
          @foreach(P parts)
             part_name = "@(P.name)";
             @foreach(I P.initializations)
20              init_name = "@(I.name)";
                @(P.name)->@(I.name)(@(I.value));
          @end
       @end
       }
25  catch (::CORBA::Exception& e) {
       DOE_ERR(F, "Can't initialize '%s' in part '%s':\n%s\n",
          init_name,
          part_name,
          ODF: exception_to_string(e));
30     throw;
       }
       catch (...) {

DOE_ERR(F, "Can't initialize '%s' in part '%s'\n",
35        init_name,
          part_name);
          throw;
       }

40  const char *connection_name = "<no connection>";
    const char *plug_terminal = "<no plug terminal>";
    const char *socket_terminal = "<no socket terminal>";
    try {
       @foreach(C connections)
45        plug_terminal = "@(C.plug-name)";
          socket_terminal = "@(C.socket-name)";
          connection_name = "@(C.name)";
          @(C.plug-name)@foreach(O
    C.extractor-operations)->@(O)@end->@(C.plug-operation)(@(C.socet-name)
50     @end
    }
    catch (::CORBA::Exception& e) {

DOE_ERR(F, "Can't exec connection [%s] '%s' = '%s'\n%s\n",
55        connection_name,
          plug_terminal,
          socket_terminal,
          ODF::exception_to_string(e));
```

33

P1279/SUN1P069/DRL/JOS

```
    throw;
  }
  catch (...) {
   DOE_ERR(F, "Can't exec connection [%s] '%s' = '%s'\n",
5    connection_name,
     plug_terminal,
     socket_terminal)
   throw;
  }
10 } int @(container-class)::run()
  {
   return 0; }
15 }

// This file generated by @(codegen-name) version @(codegen-version).
  // Template is @(codegen-template.name), output @(codegen-output.name).
20 // Server implementation DDL file.

module @(interface.name)DDL {
    interface @(interface.name)Data {

25 @foreach(part parts)
    attribute @(part.component.type) @(part.name);
  @end @foreach(plug plugs)
30  attribute @(plug.type) @(plug.name);
   @end

};
  };
```

34

The following materials are incorporated herein by reference in their entirety and for all purposes:
1. Ralston, Anthony, and Reilly, Edwin D. 1993. *Encyclopedia of Computer Science*. Van Norstrand Reinhold.
2. Herzog, James H. 1996. *Design and Organization of Computing Structures*. Franklin, Beedle & Associates, Inc.
3. Stone, Harold S. 1983. *Microcomputer Interfacing*. Addison Wesley.
4. Martin, James, and Chapman, Kathleen K. 1989. *Local Area Networks: Architectures and Implementations*. Prentice Hall.

We claim:

1. A computer-implemented method of automating the assembly of networked, language independent objects into a network application for use in a distributed object computing system, the method comprising:

receiving a schematic representation of said network application, said schematic representation defining a plurality of links among representations of distributed objects;

loading said schematic representation of said network application into a symbol table and storing portions of said schematic representation as a plurality of entries in said symbol table;

determining at least one program source file to be generated; determining at least one corresponding program template for use in generating said program source file, said program template including references to said plurality of entries in said symbol table; and combining said plurality of entries in said symbol table with said at least one corresponding program template to generate thereby said at least one program source file, said program source file suitable for being compiled to form a portion of said network application.

2. A method as recited in claim 1 wherein said schematic representation of said network application has been formed within a visual application builder and is arranged to represent one of a client object and a server object.

3. A method as recited in claim 2 wherein said plurality of links among representations of distributed objects are formed by a combination of elements including parts, plugs and sockets.

4. A method as recited in claim 1 wherein said element of loading said schematic representation includes loading parts, plugs and sockets of said schematic representation.

5. A method as recited in claim 1 wherein each one of said plurality of entries in said symbol table includes an identifier that maps into a corresponding value, and said element of combining said plurality of entries is operative to replace said references to said identifiers in said program template with corresponding values from said symbol table.

6. A method as recited in claim 1 further including:
requesting that said at least one program source file be compiled to form a portion of said network application.

7. A computer-implemented method of automating the assembly of networked, language independent objects into a network application for use in a distributed object computing system, the method comprising:

creating a schematic representation of said network application within a visual application builder, said schematic representation arranged to represent one of a client object and a server object, said schematic representation defining a plurality of links among representations of distributed objects;

loading said schematic representation of said network application into a symbol table and storing portions of said schematic representation as a plurality of entries in said symbol table;

determining at least one program source file to be generated;

determining at least one corresponding program template for use in generating said program source file, said program template including references to said plurality of entries in said symbol table; and combining said plurality of entries in said symbol table with said at least one corresponding program template to generate thereby said at least one program source file, said program source file suitable for being compiled to form a portion of said network application.

8. A method as recited in claim 7 wherein said plurality of links among representations of distributed objects are formed by a combination of elements including parts, plugs and sockets.

9. A method as recited in claim 8 wherein said element of loading said schematic representation includes loading said elements of said schematic representation.

10. A method as recited in claim 7 wherein each one of said plurality of entries in said symbol table includes an identifier that maps into a corresponding value, and said element of combining said plurality of entries is operative to replace said references to said identifiers in said program template with corresponding values from said symbol table.

11. A method as recited in claim 7 further including:
requesting that said at least one program source file be compiled to form a portion of said network application.

12. A computer-implemented method of loading a schematic representation of a network application into a symbol table thereby assisting in automating the assembly of networked, language independent objects into said network application for use in a distributed object computing system, said symbol table being arranged to map a plurality of identifiers to a corresponding plurality of values and said schematic representation including elements that are associated with identifiers that have values, said method comprising:

loading top-level symbols from the schematic representation into the symbol table such that identifiers associated with said top-level symbols are mapped to corresponding values;

loading parts from the schematic representation into the symbol table such that identifiers associated with said parts are mapped to corresponding values;

loading connections from the schematic representation into the symbol table such that identifiers associated with said connections are mapped to corresponding values;

loading file descriptors indicative of files used in the building of the schematic representation and indicative of program source files to generated;

loading plugs from the schematic representation into the symbol table such that identifiers associated with said plugs are mapped to corresponding values; and loading sockets from the schematic representation into the symbol table such that identifiers associated with said sockets are mapped to corresponding values.

13. A computer apparatus for use in automating the assembly of networked, language independent objects into a network application for use in a distributed object computing system, the computer apparatus comprising:

a processing unit;

an input/output device coupled to said processing unit;

a storage device in communication with said processing unit;

means for receiving a schematic representation of said network application, said schematic representation defining a plurality of links among representations of distributed objects;

means for loading said schematic representation of said network application into a symbol table and storing portions of said schematic representation as a plurality of entries in said symbol table;

means for determining at least one program source file to be generated;

means for determining at least one corresponding program template for use in generating said program source file, said program template including references to said plurality of entries in said symbol table; and means for combining said plurality of entries in said symbol table with said at least one corresponding program template to generate thereby said at least one program source file, said program source file suitable for being compiled to form a portion of said network application.

14. A computer program product comprising a computer-usable medium having computer-readable program code embodied thereon for automating the assembly of networked, language independent objects into a network application for use in a distributed object computing system, the computer program product comprising computer-readable program code for effecting the following within the computer system:

receiving a schematic representation of said network application, said schematic representation defining a plurality of links among representations of distributed objects;

loading said schematic representation of said network application into a symbol table and storing portions of said schematic representation as a plurality of entries in said symbol table;

determining at least one program source file to be generated;

determining at least one corresponding program template for use in generating said program source file, said program template including references to said plurality of entries in said symbol table; and combining said plurality of entries in said symbol table with said at least one corresponding program template to generate thereby said at least one program source file, said program source file suitable for being compiled to form a portion of said network application.

15. A computer program product as recited in claim 14 wherein said schematic representation of said network application has been formed within a visual application builder and is arranged to represent one of a client object and a server object.

16. A computer program product as recited in claim 15 wherein said plurality of links among representations of distributed objects are formed by a combination of elements including parts, plugs and sockets.

17. A computer program product as recited in claim 14 wherein said element of loading said schematic representation includes loading parts, plugs and sockets of said schematic representation.

18. A computer program product as recited in claim wherein each one of said plurality of entries in said symbol table includes an identifier that maps into a corresponding value, and said element of combining said plurality of entries is operative to replace said references to said identifiers in said program template with corresponding values from said symbol table.

19. A method as recited in claim 14 further including requesting that said at least one program source file be compiled to form a portion of said network application.

20. A computer-implemented method of transmitting the computer-readable program code as recited in claim 14, the method comprising:

storing the program code onto a computer-usable medium;

receiving a request for the transmission of the program code; and transmitting the program code over a network to a remote location on the network.

21. A computer program product comprising a computer-usable medium having computer-readable program code embodied thereon for automating the assembly of networked, language independent objects into a network application for use in a distributed object computing system, the computer program product comprising computer-readable program code for effecting the following [steps] within the computer system:

creating a schematic representation of said network application within a visual application builder, said schematic representation arranged to represent one of a client object and a server object, said schematic representation defining a plurality of links among representations of distributed objects;

loading said schematic representation of said network application into a symbol table and storing portions of said schematic representation as a plurality of entries in said symbol table;

determining at least one program source file to be generated; determining at least one corresponding program template for use in generating said program source file, said program template including references to said plurality of entries in said symbol table; and combining said plurality of entries in said symbol table with said at least one corresponding program template to generate thereby said at least one program source file, said program source file suitable for being compiled to form a portion of said network application.

22. A computer program product as recited in claim 21 wherein said plurality of links among representations of distributed objects are formed by a combination of elements including parts, plugs and sockets.

23. A computer program product as recited in claim 22 wherein said element of loading said schematic representation includes loading said elements of said schematic representation.

24. A computer program product as recited in claim 21 wherein each one of said plurality of entries in said symbol table includes an identifier that maps into a corresponding value, and said element of combining said plurality of entries is operative to replace said references to said identifiers in said program template with corresponding values from said symbol table.

25. A method as recited in claim 21 further including:

requesting that said at least one program source file be compiled to form a portion of said network application.

26. A computer-implemented method of transmitting the computer-readable program code as recited in claim 21, the method comprising:

storing the program code onto a computer-usable medium;

receiving a request for the transmission of the program code; and transmitting the program code over a network to a remote location on the network.

27. A computer program product comprising a computer-usable medium having computer-readable program code embodied thereon for loading a schematic representation of a network application into a symbol table thereby assisting in automating the assembly of networked, language independent objects into said network application for use in a distributed object computing system, said symbol table being arranged to map a plurality of identifiers to a corresponding plurality of values and said schematic representation including elements that are associated with identifiers that have values, the computer program product comprising computer-readable program code for effecting the following within the computer system:

loading top-level symbols from the schematic representation into the symbol table such that identifiers associated with said top-level symbols are mapped to corresponding values;

loading parts from the schematic representation into the symbol table such that identifiers associated with said parts are mapped to corresponding values; loading connections from the schematic representation into the symbol table such that identifiers associated with said connections are mapped to corresponding values; loading file descriptors indicative of files used in the building of the schematic representation and indicative of program source files to generated; loading plugs from the schematic representation into the symbol table such that identifiers associated with said plugs are mapped to corresponding values; and loading sockets from the schematic representation into the symbol table such that identifiers associated with said sockets are mapped to corresponding values.

28. A computer-implemented method of transmitting the computer-readable program code as recited in claim 27, the method comprising:

storing the program code onto a computer-usable medium;

receiving a request for the transmission of the program code; and transmitting the program code over a network to a remote location on the network.

* * * * *

UNITED STATES PATENT AND TRADEMARK OFFICE
CERTIFICATE OF CORRECTION

PATENT NO. : 5,860,004
DATED : January 12, 1999
INVENTOR(S) : Fowlow et al.

It is certified that error appears in the above-identified patent and that said Letters Patent is hereby corrected as shown below:

Column 1, line 43, change "te" to --the--.
Column 16, line 14, delete "generated" after "non-generated".

Signed and Sealed this

Twenty-second Day of June, 1999

Attest:

Q. TODD DICKINSON

*Attesting Officer*    *Acting Commissioner of Patents and Trademarks*